United States Patent
Mitsukami et al.

(10) Patent No.: US 8,975,339 B2
(45) Date of Patent: Mar. 10, 2015

(54) SURFACE TREATMENT METHOD FOR WATER-ABSORBENT RESIN

(75) Inventors: Yoshiro Mitsukami, Kobe (JP); Taku Iwamura, Himeji (JP); Makoto Matsumoto, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 520 days.

(21) Appl. No.: 12/678,856

(22) PCT Filed: Oct. 8, 2008

(86) PCT No.: PCT/JP2008/068694
§ 371 (c)(1), (2), (4) Date: Mar. 18, 2010

(87) PCT Pub. No.: WO2009/048160
PCT Pub. Date: Apr. 16, 2009

(65) Prior Publication Data
US 2010/0261850 A1 Oct. 14, 2010

(30) Foreign Application Priority Data

Oct. 9, 2007 (JP) ................................. 2007-263590
Oct. 9, 2007 (JP) ................................. 2007-263593
Jul. 17, 2008 (JP) ................................. 2008-185928

(51) Int. Cl.
  *C08J 3/24* (2006.01)
  *C08F 20/06* (2006.01)
  *C08F 265/02* (2006.01)

(52) U.S. Cl.
  CPC .............. *C08J 3/245* (2013.01); *C08J 2300/14* (2013.01)
  USPC ................ 525/242; 525/329.7; 525/330.1; 525/330.2

(58) Field of Classification Search
  USPC .................... 525/242, 329.7, 330.1, 330.2
  See application file for complete search history.

(56) References Cited

FOREIGN PATENT DOCUMENTS

| | | |
|---|---|---|
| JP | 63-99211 | 4/1988 |
| JP | 63-099211 | 4/1988 |
| JP | 2530668 | 9/1996 |
| JP | 10-316764 | 12/1998 |
| JP | 2005-200630 | 7/2005 |
| WO | 2002/22717 | 3/2002 |
| WO | WO 2006/062253 | 6/2006 |
| WO | WO 2006/062253 A1 * | 6/2006 |
| WO | 2008/074456 | 6/2008 |
| WO | 2008/114847 | 9/2008 |

* cited by examiner

*Primary Examiner* — Roberto Rabago
(74) *Attorney, Agent, or Firm* — Cesari and McKenna, LLP

(57) ABSTRACT

Provided is a surface treatment method for a water-absorbent resin having excellent production efficiency, absorption capacity against pressure, fluid permeability or the like. Provided is a method for the surface treatment of a water-absorbent resin which comprises a) a step for mixing 0.1 to 20 parts by weight of an acid group-containing radically polymerizable compound and 5 to 20 parts by weight of water, relative to 100 parts by weight of a water-absorbent resin; and b) a step for polymerizing the acid group-containing radically polymerizable compound, wherein neutralization ratio of the acid group-containing radically polymerizable compound is 0 to 60% by mol, and is lower than neutralization ratio of the water-absorbent resin.

3 Claims, 4 Drawing Sheets

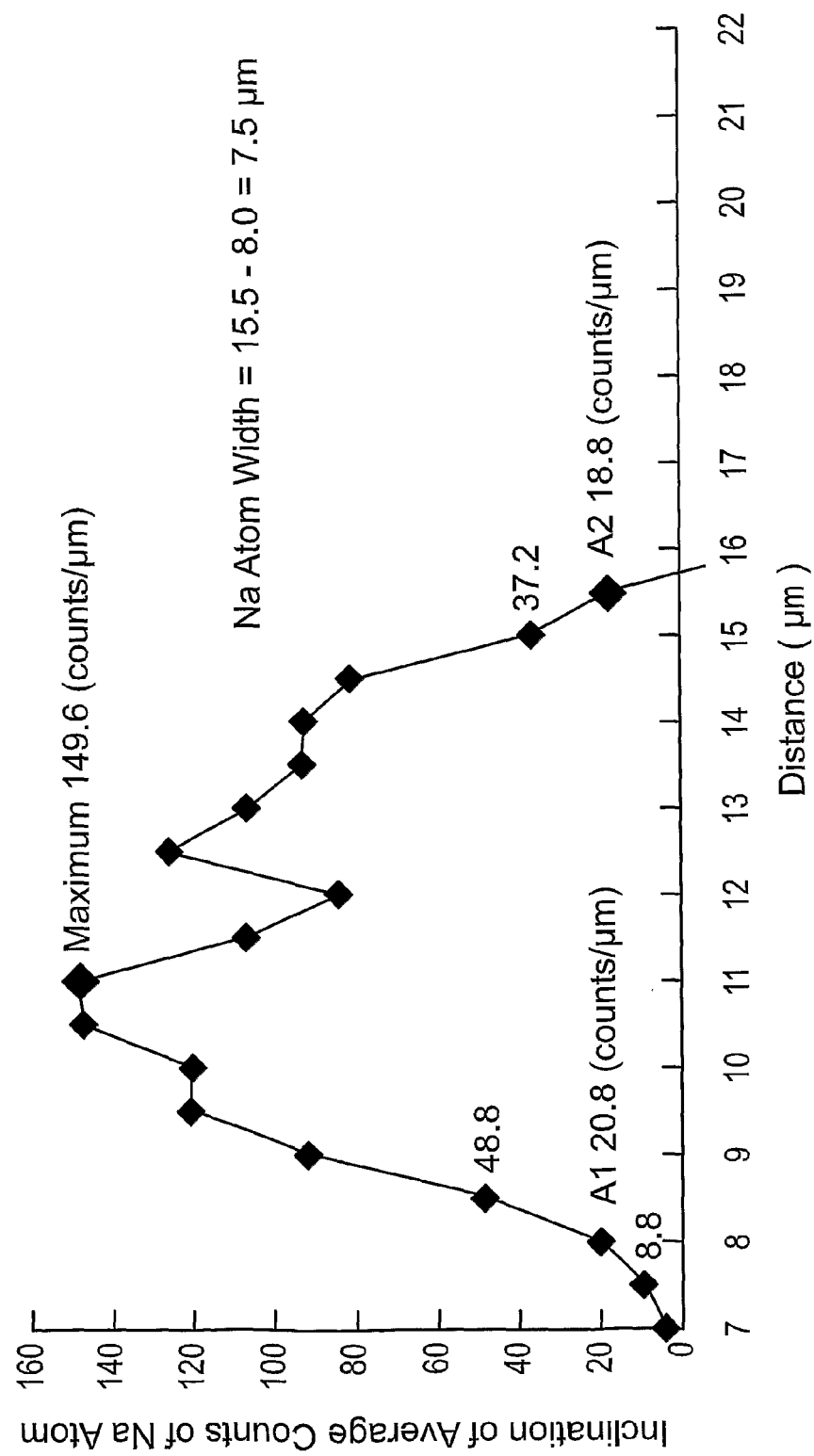

SURFACE TREATMENT METHOD FOR WATER-ABSORBENT RESIN

CROSS REFERENCE TO RELATED APPLICATIONS

This application is a National Stage of International Application No. PCT/JP2008/068694, filed on Oct. 8, 2008, which claims the priority of Japanese Application No. 2007-263590 filed Oct. 9, 2007, which claims priority of Japanese Application No. 2007-263593 filed Oct. 9, 2007, which claims priority of Japanese Application No. 2008-185928 filed Jul. 17, 2008. The contents of the prior applications mentioned above are incorporated herein by reference in their entirety.

TECHNICAL FIELD

The present invention relates to a surface treatment method for a water-absorbent resin. More specifically, the present invention relates to a surface treatment method for a water-absorbent resin, wherein a radical generation means such as irradiation of activated energy rays and/or heating is applied to a mixture of a water-absorbent resin with an acid group-containing radically polymerizable compound and water, to polymerize the acid group-containing radically polymerizable compound to the water-absorbent resin.

BACKGROUND ART

A water-absorbent resin has been hitherto used as one component for hygienic materials such as sanitary cotton, disposable diaper, and hygienic goods of absorbing another body fluid. As an example of such a water-absorbent resin, a hydrolysate of a starch-acrylonitrile graft polymer, a neutralized starch-acrylic acid graft polymer, a saponified vinyl acetate-acrylic acid ester copolymer, a hydrolysate of an acrylonitrile copolymer or acrylamide copolymer, a crosslinked substance thereof, and partially neutralized crosslinked acrylic acid or the like are cited, for example. These water-absorbent resins invariably possess an internal crosslinked structure and exhibit no solubility in water.

Characteristic properties, which these water-absorbent resins are expected to possess, include high absorbency, excellent absorption speed, high gel strength, and excellent suction force necessary for sucking water from a substrate and the like. Because water-absorbing properties are affected by crosslink density, they do not necessarily show positive correlations with one another, as evinced by the fact that increase in crosslink density leads to increase in gel strength but decrease in the amount of water absorbed. Particularly, absorption capacity is in a contradictory relation with absorption speed, gel strength, and suction force and the like. Therefore, in the water-absorbent resin particle, which has acquired enhanced absorbency, when the water-absorbent resin particles contact with water, water is not diffused throughout the entire volumes of water-absorbent resin particles, to induce extreme deterioration of absorption speed, since uniform absorption of water is not carried out and forms portions of partial aggregation of itself.

For the purpose of relaxing this phenomenon and obtaining the water-absorbent resin having high absorption capacity and relatively satisfactory absorption speed, a method for coating a surface of the water-absorbent resin particles with a surfactant or a nonvolatile hydrocarbon has been known. This method indeed improves dispersibility of initially absorbed water but brings no sufficient effects in enhancing absorption speed and suction force of the individual resin particle.

In addition, as a method for producing a polyacrylic acid-type polymer with improved water-absorbing property, there has been proposed a method for subjecting an aqueous composition having a partial alkali metal salt of polyacrylic acid as a main component and having low crosslink density, to heating in the presence of a water-soluble peroxide radical initiator, thereby introducing a crosslink therein by radical crosslinking (U.S. Pat. No. 4,910,250). It is difficult to distribute uniformly internal crosslinks in the polymer and uneasy to adjust the crosslink density. Thus, there has been adopted a method for preparing a polymer which contains water-soluble polyacrylic acid gel having low crosslink density, and then heating the polymer together with a persulfate as a polymerization initiator added thereto. U.S. Pat. No. 4,910,250 has disclosed that the precise control of crosslink density is realized by adjusting the added amount of the initiator and, due to the uniform presence of crosslinks in the polymer, excellent water-absorbing characteristics is obtained and the water-absorbent resin having no stickiness is obtained.

While the persulfate, which is used in U.S. Pat. No. 4,910,250, is decomposed by heat, it is also decomposed by ultraviolet rays to generate radicals (J. Phys. Chem., 1975, 79, 2693, J. Photochem. Photobiol., A, 1988, 44, 243). Because persulfate function as a polymerization initiator, an aqueous solution of a water-soluble vinyl monomer, when exposed to irradiation, dissociates the initiator to generate radicals, and a monomer radical generated attacks the next monomer to enable production of synthetic polymer gel (EP-A-1 400 538). In the method in EP-A-1 400 538, polymerization of a water soluble vinyl monomer and crosslinking of the generated polymer can be carried out simultaneously, by irradiation of UV rays to an aqueous solution containing the water soluble vinyl monomer having a specific structure and a persulfate salt. It should be noted that there is a reaction system which forms an internal crosslink by adding a hydrophilic polymer component, a photo-polymerization initiator, and still more a crosslinking agent together and irradiating them with light (US-A-2006-052,478). In US-A-2006-052,478, crosslinked hydrogel is obtained by using a persulfate salt as a photo-polymerization initiator, and radiating UV rays to an aqueous solution of a water soluble polymer in the presence of a crosslinking agent.

Meanwhile, there has been also known a method for enhancing crosslink density of the surface of a water-absorbent resin by treatment of the surface of the water-absorbent resin with a crosslinking agent (for example, U.S. Pat. No. 4,666,983 and U.S. Pat. No. 5,422,405). As described above, the water-absorbent resin is a water-insoluble polymer having internal crosslink, which is produced by formulating an internal crosslinking agent and a polymerization initiator to a polymerizable monomer and polymerizing. On the surface of the water-absorbent resin after polymerization, reactive functional groups contained in the monomer are present. Therefore, by introduction of a crosslink between functional groups by the addition of a surface crosslinking agent capable of reacting with the functional groups, it is possible to provide a water-absorbent resin having increased crosslink density and excellent water-absorbing characteristics even under pressure.

However, in the case of using the above surface crosslinking agent, there are problems in that a crosslink formation reaction must be performed at high temperature for a long period of time, and a crosslinking agent remains unreacted or the like. In consideration of this, there has been proposed also a method for introducing crosslinks to polymer molecular chains at the vicinity of the surface of the resin by decomposition of a radical initiator, by subjecting an aqueous solution containing a peroxide radical initiator to contact with a resin, and heating the resin (U.S. Pat. No. 4,783,510). In examples of U.S. Pat. No. 4,783,510, the water-absorbent resin exhibiting excellent absorption capacity is obtained by heating with superheated steam at 130° C. for 6 minutes. In addition, there has been disclosed a method that the water-absorbent resin of enhanced water absorption capacity is obtained by impregnating a hydrophilic multifunctional unsaturated compound such as N,N'-methylenebisacrylamide into an aqueous solution containing persulfate as a radical initiator, and contacting the aqueous solution with the resin, and then heating.

In addition, there has been proposed also a method for producing an improved water-absorbent resin having higher crosslink density at the vicinity of the particle surface of the water-absorbent resin as compared with the inside of the particle, by impregnation, polymerization and heating a water-soluble ethylenically unsaturated monomer into a water-absorbent resin (JP-B-2,530,668). In this case, the water-absorbent resin having higher crosslink density at the vicinity of the surface as compared with the inside of the particle is obtained, because a crosslinking agent is introduced into a solution containing the water-soluble ethylenically unsaturated monomer in higher concentration than concentration of the crosslinking agent used in polymerization of the water-absorbent resin, to form a polymerization layer on the surface of the water-absorbent resin, by using this solution. In the method described in JP-B-2,530,668, there can be used a water-soluble radical polymerization initiator such as potassium persulfate, sodium persulfate in surface treatment, and in the Example, polymerization is initiated by heating this at 60° C.

As other technology aiming at improving various water-absorbing characteristics of the water-absorbent resin, there have been proposed methods for enhancing crosslink density at the vicinity of the surface of the water-absorbent resin, by surface treatment of the water-absorbent resin (JP-A-63-99, 211, JP-A-1-126,314, JP-A-2007-119,757, JP-A-2005-97, 585, WO 2006/62,253, JP-A-2005-213,523).

DISCLOSURE OF INVENTION

An object of subjecting a water-absorbent resin to surface treatment is directed toward producing a water absorbing resin having excellent balance between absorption capacity and absorption speed. Generally, this object requires a crosslinking agent having at least two functional groups capable of reacting with a functional group present on the surface of the water-absorbent resin so as to act on the water-absorbent resin. Such a crosslinking agent includes polyhydric alcohols, polyvalent glycidyl ethers, haloepoxy compounds, polyvalent aldehydes, polyvalent amines, and polyvalent metal salts and the like. Because these crosslinking agents have low reactivity, however, the relevant reaction is required to be carried out at high temperature and occasionally to be retained in a heated state for a long time. The reaction, therefore, demands copious amounts of energy and time.

Also in the surface treatment method of U.S. Pat. No. 4,783,510, where a peroxide-type radical initiator is used as a crosslinking agent, high reaction temperature and humidification for maintaining amount of water sufficient to progress the reaction are necessary, and thus further enhancement of production efficiency has been required.

Under these circumstances, it is an object of the present invention to provide a method for the surface treatment of a water-absorbent resin having excellent production efficiency, and is capable of enhancing absorption capacity against pressure and fluid permeability of the water-absorbent resin, by a safe method at low temperature and in a short period of time.

In consideration of the above problems, the present inventors have studied in detail on conditions of a surface treatment method for the water-absorbent resin. As a result, there has been found that in a conventionally known surface treatment method, where a radically polymerizable compound, a water-absorbent resin and water are mixed, and then activated energy rays are irradiated (for example, US 2005/048,221, WO 2006/062,253), neutralization rate of an acid group-containing radically polymerizable compound and amount of water used in mixing the water-absorbent resin and the acid group-containing radically polymerizable compound fulfill an important role to reaction rate of surface treatment. It has been found that also in carrying out heat treatment instead of irradiation treatment by activated energy rays, the above specific conditions have important role. Still more, it has been found that water-absorbing characteristics of the water-absorbent resin obtained by polymerization of the acid group-containing radically polymerizable compound, and by surface treatment is extremely excellent. On the based on the knowledge, the present invention has been completed.

Specifically, the present invention relates to a method for the surface treatment of a water-absorbent resin which comprises: a) a step for mixing 0.1 to 20 parts by weight of an acid group-containing radically polymerizable compound and 5 to 20 parts by weight of water, relative to 100 parts by weight of a water-absorbent resin; and b) a step for polymerizing the acid group-containing radically polymerizable compound, wherein neutralization ratio of the acid group-containing radically polymerizable compound is 0 to 60% by mol, and is lower than neutralization ratio of the water-absorbent resin.

According to the present invention, surface treatment can be carried out at low temperature and in a short period of time, where a surface crosslinking agent requiring heating at high temperature is not an essential component. As a result, the surface treated water-absorbent resin has extremely high characteristics desired in practical use of the water-absorbent resin, such as absorption capacity against pressure, fluid permeability. Still more, according to the present invention, surface treatment of the water-absorbent resin can be carried out in a shorter period of time as compared with a conventional method, by using the acid group-containing radically polymerizable compound with low neutralization ratio, and by relatively increased amount of water to be mixed.

The above and other objects, features and advantages of the present invention will become clear from the following description of the preferred embodiments.

BRIEF DESCRIPTION OF DRAWING(S)

FIG. 1 is a schematic drawing of a measurement apparatus used in measurement of saline flow conductivity (SFC). In the FIG. 1, 31 stands for tank; 32 for glass tube; 33 for aqueous solution of 0.69% by weight of sodium chloride; 34 for L-character tube; 35 for cock; 40 for container; 41 for cell; 42, 43 for stainless steel mesh-screen; 44 for swollen gel; 45 for glass filter; 46 for piston; 47 for hole; 48 for collection container; and 49 for even balance.

FIG. 2C is a graph showing the inclination of average counts of Na atom against distance (μm).

BEST MODE FOR CARRYING OUT THE INVENTION

Figure 1:
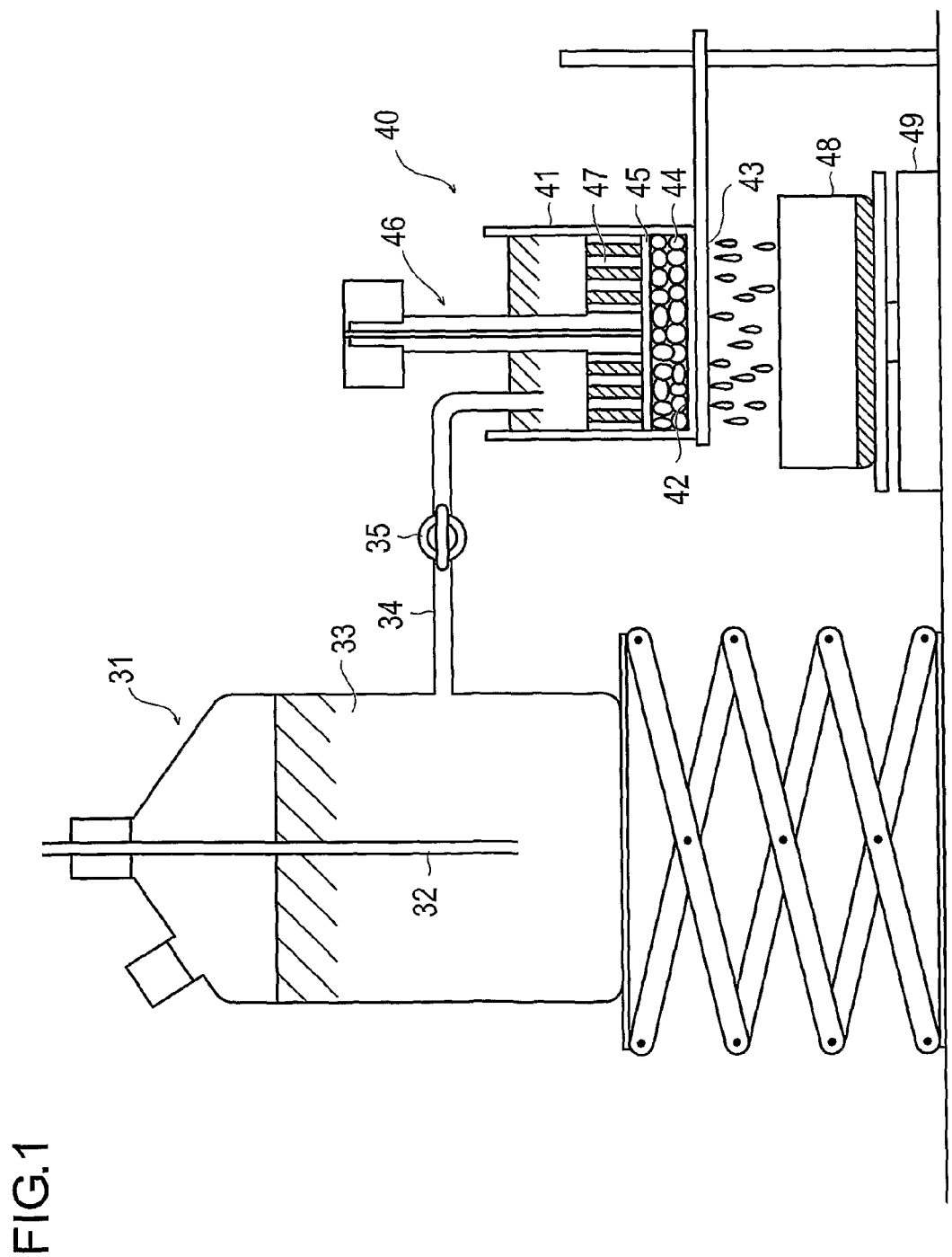

The present invention will be described in detail.

It should be noted that, in the present invention, "weight" and "mass" are treated as synonyms, "% by weight" and "% by mass" are treated as synonyms, and "ppm by weight" and "ppm by mass" are treated as synonyms.

A first aspect of the present invention is to provide a method for the surface treatment of a water-absorbent resin which comprises a) a step for mixing 0.1 to 20 parts by weight of an acid group-containing radically polymerizable compound and 5 to 20 parts by weight of water, relative to 100 parts by weight of a water-absorbent resin; and b) a step for polymerizing the acid group-containing radically polymerizable compound, wherein neutralization ratio of the acid group-containing radically polymerizable compound is 0 to 60% by mol, and is lower than neutralization ratio of the water-absorbent resin.

Explanations will be given below in detail on a surface treatment method for the water-absorbent resin relevant to the present invention, however, the scope of the present invention should not be restricted to these explanations, and the present invention may be carried out also by modification other than the exemplification below, as appropriate, within the range not to impair the drift of the present invention.

(a) Water-Absorbent Resin (Base Polymer)

The water-absorbent resin which can be used in the present invention is a water-swelling, water-insoluble crosslinked polymer capable of forming hydrogel. The term "water-swelling" as used in the present invention refers to a free swelling capacity (GV) in physiological saline of equal to or higher than 2 g/g, preferably 5 to 100 g/g and more preferably 10 to 60 g/g. It should be noted that as value of free swelling capacity, value measured by a method described in examples is adopted. In the present invention, physiological saline means, unless otherwise specified, an aqueous solution of 0.9% by weight sodium chloride.

In addition, the term "water-insoluble" refers to the uncrosslinked water-extractable components (water-soluble polymer: hereafter may be referred to as "extractable content") in the water-absorbent resin, with content in the range of 0 to 50% by weight, preferably 0 to 25% by weight, and still more preferably 0 to 15% by weight. As value of extractable content, value measured by a method described in examples is adopted.

In the present description, the expression "polymerizing an acid group-containing radically polymerizable compound" refers to polymerizing an acid group-containing radically polymerizable compound to a water-absorbent resin. As used herein, the term "polymerizing" refers to any of physical or chemical actions of the acid group-containing radically polymerizable compound to the water-absorbent resin, and includes "surface treatment", preferably such as surface crosslinking, hole formation, making hydrophilicity, making hydrobicity of the water-absorbent resin and the like, and more preferably surface crosslinking of the water-absorbent resin.

The water-absorbent resin which can be used in the present invention may preferably have an acid group, and particularly preferably, a carboxyl group, and is not especially limited as long as it is obtained by polymerizing of a monomer component essentially containing an ethylenically unsaturated monomer by means of a conventionally known method or the like. In addition, as an acid group-containing water-absorbent resin, a crosslinked substance of a water-soluble polymer, for example, a crosslinked substance of CMC or a crosslinked substance of polyaspartic acid may be used also, as well as a polymer of the ethylenically unsaturated monomer.

The ethylenically unsaturated monomer is not especially limited, and is preferably a monomer having an unsaturated double bond at the terminal thereof. For example, an anionic monomer such as (meth)acrylic acid, 2-(meth)acryloyl ethane sulfonic acid, 2-(meth)acryloyl propane sulfonic acid, 2-(meth)acrylamide-2-methyl propane sulfonic acid, vinyl sulfonic acid, styrene sulfonic acid or a salt thereof; a non-ionic hydrophilic group-containing monomer such as (meth)acrylamide, N-substituted (meth)acrylamide, 2-hydroxyethyl(meth)acrylate, 2-hydroxypropyl(meth)acrylate; and an amino group-containing unsaturated monomer such as N,N-dimethylaminoethyl(meth)acrylate, N,N-diethylaminoethyl(meth)acrylate, N,N-diethylaminopropyl(meth)acrylate, N,N-dimethylaminopropyl(meth)acrylamide, or a quaternized product thereof; or the like may be cited. These ethylenically unsaturated monomers may be used either alone or in combination of two or more kinds, selected from these monomers. Preferably, (meth)acrylic acid, 2-(meth)acryloyl ethane sulfonic acid, 2-(meth)acrylamide-2-methylpropanesulfonic acid, and a salt thereof, N,N-dimethylaminoethyl(meth)acrylate, a quaternized compound of N,N-dimethylaminoethyl (meth)acrylate and (meth)acrylamide are included, and acrylic acid and/or a salt thereof are particularly preferable. Ratio of acrylic acid (salt) is preferably 50 to 100% by mol, still more preferably 70 to 100% by mol, and particularly preferably 90 to 100% by mol, relative to total monomers.

When an acrylic acid salt is used as the monomer, a monovalent salt of acrylic acid, selected from an alkali metal salt, an ammonium salt, and an amine salt of acrylic acid is preferable from the viewpoint of water-absorbing performance of the water-absorbent resin. It is more preferable to be the alkali metal salt of acrylic acid and particularly preferably the acrylic acid salt selected from a sodium salt, a lithium salt, and a potassium salt.

In producing the water-absorbent resin, other monomer components other than the above monomers may be used, in the range not to impair the effect of the present invention. For example, there may be exemplified a hydrophobic monomer such as an aromatic ethylenically unsaturated monomer having carbon atoms of to 30, an aliphatic ethylenically unsaturated monomer having carbon atoms of 2 to 20, an alicyclic ethylenically unsaturated monomer having carbon atoms of 5 to 15, an alkyl ester of (meth)acrylic acid containing an alkyl group having carbon atoms of 4 to 50. Ratio of such a hydrophobic monomer is generally in the range of from 0 to 20 parts by weight, relative to 100 parts by weight of the above ethylenically unsaturated monomer. The hydrophobic monomer over 20 parts by weight would deteriorate water-absorbing performance of the resulting water-absorbent resin.

The water-absorbent resin used in the present invention is insolubilized by the formation of an internal crosslink. This internal crosslink may be a self-crosslink type without using a crosslinking agent, however, it may be formed by using an internal crosslinking agent having equal to or more than two polymerizable unsaturated groups and/or equal to or more than two reactive functional groups in one molecule.

Such an internal crosslinking agent is not especially limited, and preferably includes, for example, N,N'-methylenebis(meth)acrylamide, N-methylol (meth)acrylamide, glycidyl(meth)acrylate, (poly)ethylene glycol di(meth)acrylate, (poly)propylene glycol di(meth)acrylate, glycerin tri(meth)acrylate, glycerin acrylate methacrylate, pentaerythritol tri (meth)acrylate, pentaerythritol tetra(meth)acrylate, dipentaerythritol hexa(meth)acrylate, a polyvalent metal salt of (meth)acrylic acid, trimethylol propane tri(meth)acrylate, trimethylol propane di(meth)acrylate, glycerin di(meth)acrylate, triallyl amine, triallyl cyanurate, triallyl isocyanurate, triallyl phosphate, ethylene glycol diglycidyl ether, (poly) glycerol glycidyl ether, polyethylene glycol diglycidyl ether or the like. These internal crosslinking agents may be used in combination of two or more kinds. Among them, a polymerizable crosslinking agent which is polymerizable with a monomer, particularly an ethylenically unsaturated monomer, is preferable. (Poly)ethylene glycol di(meth)acrylate is preferably used.

An amount of the internal crosslinking agent used is preferably in the range of 0.0001 to 1% by mol, more preferably 0.001 to 0.5% by mol, and still more preferably 0.005 to 0.2% by mol, relative to total amount of monomer components used in the production of the water-absorbent resin. The amount less than 0.0001% by mol would provide no introduction of the internal crosslinking agent into the resin. On the other hand, the amount over 1% by mol would provide too high gel strength of the water-absorbent resin to lower absorption capacity. In the case where the crosslinked structure is introduced inside the polymer by using the internal crosslinking agent, the internal crosslinking agent may be added into the reaction system before, during, or after the polymerization of the monomer, or after neutralization.

In order to obtain the water-absorbent resin, monomer components including the above monomer and the internal crosslinking agent may be polymerized in an aqueous solution. A polymerization initiator which can be used in this case includes a water-soluble radical polymerization initiator such as a persulfate such as potassium persulfate, ammonium persulfate, sodium persulfate; potassium peracetate, sodium peracetate, potassium percarbonate, sodium percarbonate, t-butyl hydroperoxide; hydrogen peroxide; an azo compound such as 2,2'-azobis(2-amidinopropane)dihydrochloride; or a photo-polymerization initiator such as 2-hydroxy-2-methyl-1-phenyl-propan-1-one. In addition, for example, the above water-soluble radical polymerization initiator may be combined with a reducing agent such as a sulfite, L-ascorbic acid, or a ferric salt so as to be used as a redox type initiator. Amount of the polymerization initiator used is not particularly limited, but is preferably in the range of 0.001 to 2% by mol, more preferably 0.001 to 0.5% by mol, relative to total amount of monomer components. In the case of using an redox type initiator, amount of the redox type initiator is not particularly limited, but is preferably in the range of 0.0001 to 2% by mol, more preferably 0.001 to 1.5% by mol, relative to total amount of monomer components.

Concentration of the monomer in the above aqueous monomer solution is not especially limited, however, it is preferably 15 to 90% by weight, and more preferably 35 to 80% by weight. The concentration lower than 15% by weight would provide hydrogel having high water content, which results in to require heat and time for drying, and thus not advantageous.

A polymerization method is not especially limited, and may be selected from well-known methods such as aqueous solution polymerization, reversed-phase suspension polymerization, precipitation polymerization, bulk polymerization. Among these methods, aqueous solution polymerization where a monomer is dissolved in an aqueous solution to be subjected to polymerizing, or reversed phase suspension polymerization is preferable, in view of easiness of control of a polymerization reaction or performance of the resulting water-absorbent resin.

In initiating the polymerization, the polymerization initiator is used to effect the initiation. In addition to the polymerization initiator, activated energy rays as ultraviolet rays, electron beams, γ rays may be used either alone or in combination with a polymerization initiator. Though temperature in initiating the polymerization depends on kind of a polymerization initiator to be used, it is preferably in the range of 15 to 130° C. and more preferably in the range of 20 to 120° C. The temperature in initiating the polymerization outside the above range would increase residual monomers in the resulting water-absorbent resin or would deteriorate water-absorbing performance of the resulting water-absorbent resin, caused by proceeding of an excessive self crosslinking reaction, therefore it is not preferable. Polymerization time, though particularly limited, is preferably in the range of 30 seconds to 60 minutes.

The term "reversed phase suspension polymerization" refers to a method of polymerization performed in a suspended state of an aqueous monomer solution in a hydrophobic organic solvent, which is described, for example, in U.S. Pat. No. 4,093,776, U.S. Pat. No. 4,367,323, U.S. Pat. No. 4,446,261, U.S. Pat. No. 4,683,274, and U.S. Pat. No. 5,244,735 or the like. The term "aqueous solution polymerization" refers to a method for polymerizing an aqueous monomer solution without using a dispersing solvent, which is described, for example, in U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808, in European Patent No. 0 811 636, No. 0 955 086, and No. 0 922 717. The monomers and the initiators which are exemplified in these polymerization methods can be applied to the present invention.

In carrying out polymerization, partially neutralized acrylic acid may be polymerized, or after polymerization of an acid group-containing monomer such as acrylic acid, neutralization of the resulting polymer may be carried out with an alkali compound such as sodium hydroxide, sodium carbonate. Accordingly, the water-absorbent resin to be used in the present invention preferably has an acid group and a specific neutralization ratio (% by mol of the neutralized acid groups in the whole acid groups). In this case, the neutralization ratio of the resulting water-absorbent resin (% by mol of the neutralized acid groups in the whole acid groups) is preferably in the range of 25 to 100% by mol, more preferably 40 to 100% by mol, still more preferably 50 to 90% by mol, still further preferably in the range of 50 to 80% by mol, and most preferably in the range of 60 to 75% by mol.

After polymerization, a water-containing gel-like crosslinked polymer is usually obtained. In the present invention, the water-containing gel-like crosslinked polymer may be used as it is as a water-absorbent resin, however, preferably it is used after drying. The drying may be effected, for example, by using a drier such as a hot air drier, preferably at a temperature of 100 to 220° C. and more preferably at a temperature 120 to 200° C. When a water-containing gel-like crosslinked polymer obtained by polymerization is aggregated, such a water-containing gel-like crosslinked polymer may be gain-refined for pulverizing the polymer prior to drying step, in order to change form of the water-containing gel-like crosslinked polymer into a particulate form. The resultant particulate hydrogel can be subjected to drying step as described above efficiently due to its large surface area. The pulverization may be carried out by using various cutting means such as roller type cutter, guillotine cutter, slicer, roll cutter, shredder, and scissors, singly or in combination thereof, although not limited thereto.

In addition, it is preferable to carry out crushing after the above drying. As a crusher to be used in the crushing, such one is preferably used that has at least one of crushing mechanisms such as cutting, shearing, striking, and rubbing, among shear rough crushers, impact shredders, and high speed rotary crushers included in the names of the crushers classified in Table 1.10 of Particle Technology Handbook (first edition, compiled by Particle Technology Association). Among the crushers corresponding to these types, crushers which have cutting and shearing mechanism as a main mechanism can be used particularly preferably. For example, crushers such as roll mill (roll rotary type), knife mill, hammer mill, pin mill, and jet mill may be preferably used. The crusher is preferably provided with a heating means on its inner wall.

In addition, it is preferable to carry out continuous classification of dried or crushed product after drying or crushing step. Such a classification step, though not particularly limited, is carried out by sieve classification (metal sieve, stainless steel sieve). Preferably, a plurality of sieves are simultaneously used in the classification step, in order to attain desired characteristics and particle size. Further, the classification step is preferably carried out prior to surface treatment step as described below or at two or more times before and after the surface treatment step. The continuous classification step is preferably carried out while heating or keeping the heat of the sieve.

The water-absorbent resin used in the present invention is preferred in a powdery form. More preferably, it is a powdery water-absorbent resin which contains particles with diameter in the range of 150 to 850 μm (as defined by sieve classification) in a proportion of 90 to 100% by weight, and particularly preferably 95 to 100% by weight. The resulting water-absorbent resin having a particle diameter of larger than 850 μm, when surface treated and used in disposable diapers and the like, for example, may impart disagreeable feeling to the user's skin and may break the top sheet of a diaper. On the other hand, the particles with a diameter of smaller than 150 μm in a proportion exceeding 10% by weight, may provide scattering of fine particles and clogging while in use and deteriorate water-absorbing performance of the surfate-treated water-absorbent resin. Weight average particle diameter of the water-absorbent resin is in the range of 10 to 1,000 μm, preferably 150 to 850 μm, and more preferably in the range of 200 to 600 μm, and particularly preferably 300 to 500 μm. The weight average particle diameter smaller than 10 μm, may not be favorable in terms of safety and health. On the other hand, the weight average particle diameter over 1,000 μm, may not be applied to a disposable diaper or the like. Logarithmic standard deviation of particle size distribution ($\sigma\zeta$) is preferably 0.23 to 0.45, and more preferably 0.25 to 0.35. As value of the above particle distribution [weight average particle diameter, logarithmic standard deviation of particle size distribution], value determined by the method for determination of particle size distribution described below is adopted.

[Measurement Method for Particle Size Distribution]

10 g of water-absorbent resin is sieved with test sieves having a diameter of 75 mm and an each mesh opening of 850 μm, 600 μm, 300 μm, and 150 μm (manufactured by Iida Seisakusho K.K.) to measure each weight and determine % by weight of each particle size. The sieving is effected by shaking the samples for five minutes with the sieves manufactured by Iida Seisakusho K.K. and sold under the trademark designation of Sieve Shaker ES-65 type. The water-absorbent resin is dried at 60±5° C. under reduced pressure (less than 1 mmHg (133.3 pa)) for 24 hours before use in the determination. In addition, as for weight average particle diameter, residual percentage R is plotted in a logarithm probability paper to read, from this plot, particle diameter as weight average particle diameter (D50) corresponding to R=50% by weight. Further, the particle diameters when R is 84.1% by weight and 15.9% by weight are referred to as X1 and X2, respectively. The logarithmic standard deviation ($\sigma\zeta$) is represented by the following formula. Specifically, it means that the smaller the value $\sigma\zeta$ is, the narrower the particle size distribution is.

$$\sigma\zeta = 0.5 \times \ln(X2/X1) \qquad \text{[Formula 1]}$$

In addition or alternative to the above, the water-absorbent resin to be used in the present invention has preferably a neutralization ratio as described above. In this case, the neutralization ratio of water absorbent resin may be adjusted by polymerizing monomers neutralization ratio of which have adjusted in advance, or by a neutralization method after acid polymerization (as described in U.S. Pat. No. 6,187,872) which comprises producing a polymer with lower neutralization ratio and then adjusting the resultant polymer to a desired level. Among these methods, it is preferable to produce a water-absorbent resin precursor having a low neutralization ratio by polymerization, and then to adjust total neutralization ratio by the addition of abase to hydrogel of the water-absorbent resin precursor after polymerization. Conventionally, a multifunctional surface-treatment agent has been used for the surface-treatment (surface crosslinking) of the water-absorbent resin. The multifunctional surface-treatment agent serves to react with a carboxyl group (—COOH) in the water-absorbent resin but does not react with a salt thereof (for example, —COONa). Accordingly, uniform crosslink can be attained by polymerization of an ethylenically unsaturated monomer mixture (for example, a mixture of acrylic acid and sodium acrylate) in which —COOH/—COONa ratio has been adjusted within a suitable range, in advance, to produce the water-absorbent resin having the —COOH and —COONa groups uniformly distributed therein, and using the resultant water-absorbent resin in the surface crosslinking with a multifunctional surface-treatment agent. On the other hand, when the water-absorbent resin is obtained by polymerizing a monomer mixture including an acid type ethylenically unsaturated monomer such as acrylic acid, as a main component, and then neutralizing the resultant polymer with an alkali compound such as sodium hydroxide, sodium carbonate, the resultant water-absorbent resin has small extractable content and high gel strength. However, when subjected to the surface crosslinking with a multifunctional surface-treatment agent, water-absorbing characteristics has deteriorated, because the —COOH and —COONa groups are not uniformly distributed. Accordingly, the water-absorbent resin obtained by the latter method has not been desirably subjected to a conventional surface crosslinking with a multifunctional surface treatment agent. According to a method of the present invention, because it is possible to once polymerize a monomer/a monomer mixture including, as a main component, an acid type ethylenically unsaturated monomer such as acrylic acid, to obtain a water-absorbent resin precursor having a low neutralization ratio, and then by neutralizing this water-absorbent resin precursor with an alkali compound such as sodium hydroxide or sodium carbonate, when the resulting water-absorbent resin is subjected to surface treatment, the resulting surface treated water-absorbent resin by this method can exert high gel strength and excellent water-absorbing characteristics.

In the present invention, the term "water-absorbent resin precursor having a low neutralization ratio" is referred to as a water-absorbent resin precursor having a low neutralization ratio (% by mol of the neutralized acid groups in the whole acid groups), or having no neutralized acid groups (i.e., the neutralization ratio is zero), and typically referred to one having the neutralization ratio (% by mol of the neutralized acid groups in the whole acid groups) of about 0 to 60% by mol, preferably about 0 to 50% by mol, still more preferably about 0 to 20% by mol. Such a water-absorbent resin precursor having a low neutralization ratio can be obtained by a similar method to the above by using a monomer mixture including, as a main component, an acid group-containing monomer such as acrylic acid, wherein neutralization ratio is preferably adjusted within the above range, therefore detailed explanation thereof will be omitted here.

Water content of the water-absorbent resin used in a surface treatment method for the water-absorbent resin of the present invention is not especially limited, as long as the water-absorbent resin possesses fluidity. The water-absorbent resin after being dried at 180° C. for three hours possesses water content in the range of 0 to 20% by weight, preferably 0 to 10% by weight, and more preferably 0 to 5% by weight.

The water-absorbent resin e used in the present invention is not limited to one produced by the above method and may be one prepared by some other methods. In addition, the water-absorbent resin which is obtained by the above method is the water-absorbent resin without surface crosslinking usually, however, as for the water-absorbent resin to be used in a surface treatment method for the water-absorbent resin of the present invention, it may be the water-absorbent resin which is crosslinked in advance with a polyhydric alcohol, a polyvalent epoxy compound, an alkylene carbonate, or an oxazolidone compound or the like.

(b) Acid Group-Containing Radically Polymerizable Compound

In the present invention, a radically polymerizable compound having an acid group is used essentially. Among radically polymerizable compounds, a compound having an acid group is extremely superior in view of water-absorbing characteristics. As the acid group, a carboxyl group, a sulfone group, a phosphoric acid group or the like is included.

As the acid group-containing radically polymerizable compound to be mixed with the water-absorbent resin of the present invention, a preferable one is a monomer containing an acid group among the above ethylenically unsaturated monomers. Specifically, (meth)acrylic acid, 2-(meth)acryloyl ethane sulfonic acid, 2-(meth)acryloyl propane sulfonic acid, 2-(meth)acrylamide-2-methyl propane sulfonic acid, vinyl sulfonic acid, styrene sulfonic acid and/or a salt thereof may be cited. Among these, (meth)acrylic acid and 2-(meth)acrylamide-2-methyl propane sulfonic acid are more preferable, and (meth)acrylic acid is still more preferable, and acrylic acid is particularly preferable, in view of water-absorbing characteristics. Ratio of acrylic acid (salt) is preferably 50 to 100% by mol, still more preferably 70 to 100% by mol, and particularly preferably 90 to 100% by mol, relative to total monomers. The acid group-containing radically polymerizable compound may be used alone or may be used as a mixture of two or more kinds.

In the present invention, neutralization ratio of the acid group-containing radically polymerizable compound is 0 to 60% by mol. The neutralization ratio within such a range is capable of enhancing reaction rate of polymerization (surface treatment) by irradiation of activated energy rays and/or heating in the step b), and providing the water-absorbent resin with excellent water-absorbing characteristics at low temperature and in a short period of time. Conventionally the neutralization ratio was higher as compared with a range of the present invention. It is because of risk of reduction of water absorption capacity or malodor caused by the radically polymerizable compound remaining after surface treatment. However, it has been found unexpectedly that in contradiction to conventional fear, when the acid group-containing radically polymerizable compound with lower neutralization ratio than that of the radically polymerizable compound conventionally used was dared to be used, it was capable of carrying out rapid surface treatment and that each property of the resulting water-absorbent resin was maintained.

The neutralization ratio of the acid group-containing radically polymerizable compound is preferably 0 to 50% by mole, more preferably 0 to 40% by mole, still more preferably 0 to 30% by mole, particularly preferably 0 to 15% by mole, and most preferably 0 to 10% by mole. The neutralization ratio within the above range can provide an extremely shortened period of time of surface treatment as of several ten mites, preferably several mites, while conventional time of surface treatment has been several hours. In addition, it can provide large economical effects in large scale production (preferably in continuous production) of a commercial scale of, for example, 1000 kg/hr.

In the present invention, neutralization ratio of the acid group-containing radically polymerizable compound is lower than neutralization ratio of the water-absorbent resin as base polymer. In this case, the relationship of neutralization ratio between the acid group-containing radically polymerizable compound and the water-absorbent resin is not particularly limited. Typically, relative to the neutralization ratio of the water-absorbent resin as a base polymer, numerical value ratio of neutralization ratio of the acid group-containing radically polymerizable compound to be mixed is preferably in the range of 0 to 80%, more preferably 0 to 60%, still more preferably 0 to 40%, particularly preferably 0 to 20%, and most preferably 0 to 10%. As used herein, the term "neutralization ratio" indicates ratio of acid groups neutralized relative to total acid groups of the acid group-containing radically polymerizable compound. In the case where two or more kinds of the acid group-containing radically polymerizable compounds are present, "total acid groups of the acid group-containing radically polymerizable compound" and "acid groups neutralized" indicate total of "acid groups of each of the acid group-containing radically polymerizable compounds" and total of "acid groups neutralized", respectively. For example, in the case where acrylic acid and sodium acrylate were used in a molar ratio of 1:1, as the acid group-containing radically polymerizable compound, the neutralization ratio of the acid group-containing radically polymerizable compound is 50% by mol.

In the case where the acid group-containing radically polymerizable compound is in neutralized form (in the case of a salt form), the compound is preferably a monovalent salt selected from an alkali metal salt, an ammonium salt and an amine salt, more preferably an alkali metal salt, and particularly preferably a salt selected from a sodium salt, a lithium salt, and a potassium salt.

Amount of the acid group-containing radically polymerizable compound to be used is in the range of 0.1 to 20 parts by weight, relative to 100 parts by weight of the water-absorbent resin. The amount of the acid group-containing radically polymerizable compound less than 0.1 part by weight would not enhance absorption capacity against pressure of the water-absorbent resin sufficiently. On the other hand, the amount of the acid group-containing radically polymerizable compound more than 20 parts by weight would lower absorption capacity of the resulting surface treated water-absorbent resin. In addition, amount of the acid group-containing radically polymerizable compound to be used is preferably in the range of 0.5 to 15 parts by weight, more preferably in the range of 1 to 10 parts by weight, and still more preferably in the range of 2 to 8 parts by weight, further more preferably in the range of 3 to 8 parts by weight, particularly preferably in the range of 3 to 7 parts by weight, relative to 100 parts by weight of the water-absorbent resin. The amount of the acid group-containing radically polymerizable compound within such a range can significantly express effects of the present invention that surface treatment period can be shortened.

In the present invention, a radically polymerizable compound other than the acid group-containing radically polymerizable compound may be contained. As the radically polymerizable compound other than the acid group-containing radically polymerizable compound, there are included preferably the above ethylenically unsaturated monomer and crosslinkable unsaturated monomer (multifunctional unsaturated monomer). More preferably, crosslinkable unsaturated monomer (s) is additionally used in the step a).

As the ethylenically unsaturated monomer, there may be included, a nonionic hydrophilic group-containing monomer such as (meth)acrylamide, N-substituted (meth)acrylamide, 2-hydroxyethyl(meth)acrylate, 2-hydroxypropyl(meth)acrylate or the like; an amino group-containing unsaturated monomer such as N,N-dimethylaminoethyl(meth)acrylate, N,N-diethylaminoethyl(meth)acrylate, N,N-diethylaminopropyl(meth)acrylate, N,N-dimethylaminopropyl(meth)acrylamide, or a quaternized product thereof; or the like. Amount of the ethylenically unsaturated monomer in such a case may be selected as appropriate depending on desired property, however, it is preferably 0 to 100% by weight, more preferably 1 to 50% by weight, relative to 100% by weight of radically polymerizable compound.

The crosslinkable unsaturated monomer is not especially limited, however, there may be included, for example, a monomer exemplified as an internal crosslinking agent to be used in the production of the water-absorbent resin. Among these, there is preferably used polyethylene glycol diacrylate having 2 to 50 average ethylene oxides, trimethylol propane tri(meth)acrylate, N,N'-methylene bis(meth)acrylamide, or glycerin acrylate methacrylate, glycerol diacrylate, or the like. In order to provide efficient (co)polymerization of the crosslinkable unsaturated monomer and the ethylenically unsaturated monomer on the surface of the water-absorbent resin, it is desirable that diffusion behaviors of the crosslinkable unsaturated monomer and the ethylenically unsaturated monomer in the water-absorbent resin are similar, in a mixing step with the water-absorbent resin. In order to attain this, it is desirable that the crosslinkable unsaturated monomer has properties similar to the ethylenically unsaturated monomer to be used, in view of molecular weight or hydrophilicity. Amount of the crosslinkable unsaturated monomer to be used may be selected as appropriate depending on desired property, however, it is preferably 0 to 20% by weight, more preferably 0.1 to 15% by weight, and most preferably 0.5 to 5% by weight, relative to 100% by weight of the acid group-containing radically polymerizable compound. Combined use of an acid group-containing radically polymerizable compound with a crosslinkable unsaturated monomer is capable of further enhancing absorption capacity against pressure. Reason for this enhancement of absorption capacity against pressure by combined use of an acid group-containing radically polymerizable compound with a crosslinkable unsaturated monomer is not clear, however, it may be considered to due to the formation of a crosslinked structure by the crosslinkable unsaturated monomer in polymerization of the water-soluble ethylenically unsaturated monomer, which structure is introduced on the surface of the water-absorbent resin.

In the present specification, the "ethylenically unsaturated monomer" is referred to as a monomer having one vinyl group in one molecule, and the "crosslinkable unsaturated monomer" is referred to as a monomer having two or more vinyl groups in one molecule. The ethylenically unsaturated monomer and the crosslinkable unsaturated monomer each may be used alone or may be used in combination.

In this case, molar composition ratio of ethylenically unsaturated monomer and crosslinkable unsaturated monomer as the radically polymerizable compound other than the acid group-containing radically polymerizable compound may be the same as or different from that of the water-absorbent resin as a base polymer, however, preferably it is set so that the crosslinkable monomer is contained, in molar ratio, relatively more, for example, 1.01 to 10 times more than the ethylenically unsaturated monomer, as compared with the composition of the water-absorbent resin as a base polymer. Used amount of the crosslinkable unsaturated monomer is preferably 0.001 to 100% by mol, more preferably 0.01 to 50% by mol, still more preferably 0.05 to 30% by mol, particularly preferably 0.1 to 20% by mol, and most preferably 0.5 to 10% by mol, relative to total amount of the ethylenically unsaturated monomer. It is preferable, in particular, to use acrylic acid (salt thereof) as the ethylenically unsaturated monomer, as a main component, and to use in combination the crosslinkable unsaturated monomer therewith, in view of providing excellent water-absorbing characteristics. Such a compound may be also used that has two or more polymerizable unsaturated groups other than vinyl groups and/or two or more reactive functional groups, in one molecule, instead of the crosslinkable unsaturated monomer.

In addition, by selection, as appropriate, of the acid group-containing radically polymerizable compound to be mixed with the water-absorbent resin, various properties such as hydrophilicity, hydrophobicity, adhesive property, biocompatibility can be provided to the surface of the surface treated water-absorbent resin particle. As the ethylenically unsaturated monomer providing hydrophilicity to the surface of the water-absorbent resin particle, there may be included, as an example, a hydroxy group-containing monomer such as 2-hydroxyethyl(meth)acrylate, 2-hydroxypropyl(meth)acrylate; or a polyethylene glycol-containing monomer such as polyethylene glycol(meth)acrylate, polyethylene glycol methyl ether(meth)acrylate. As the ethylenically unsaturated monomer providing hydrophobicity to the surface of the water-absorbent resin particle, there may be exemplified an alkyl (meth)acrylate such as methyl methacrylate, stearyl(meth) acrylate; an aromatic group-containing monomer such as styrene; or a fluorine-containing monomer such as 2,2,2-trifluoroethyl methacrylate. As the ethylenically unsaturated monomer providing adhesive property to the surface of the water-absorbent resin particle, there may be included a monomer forming a polymer with a grass transition temperature of equal to or lower than 25° C., such as butyl acrylate, 2-ethylhexyl acrylate; a cationic monomer such as vinyl amine, allyl amine, dimethylaminoethyl(meth)acrylate, (meth)acryloyloxyethyl trimethyl ammonium chloride; or a silane group-containing monomer such as 3-methacryloyloxypropyl trimethoxysilane. Among these, a monomer containing a silane group is preferably used, because of being capable of enhancing not only adhesive property between the water-absorbent resin particles but also adhesive property of the water-absorbent resin particles to a substrate such as a metal, glass, pulp.

Still more, by the addition of 3-methacryloyloxypropyl trimethoxysilane to an aqueous solution containing a partially neutralized acrylic acid and a persulfate salt, the water-absorbent resin having more excellent fluid permeability can be obtained, as compared with the case where it is not added. As an example of the ethylenically unsaturated monomer providing biocompatibility to the surface of the water-absorbent resin particle, there is included a monomer having a phospholipid-like structure such as 2-methacryloyloxyethylphosphorylcoline.

In order to attain an objective to modify property of the surface of the water-absorbent resin particle, it is desirable that the acid group-containing radically polymerizable compound contains a compound different from the ethylenically unsaturated monomer and the internal crosslinking agent used in producing the water-absorbent resin described in the above (a). In this case, the ethylenically unsaturated monomer with different neutralization ratio from the ethylenically unsaturated monomer used in producing a water-absorbent resin described in the above (a) may be included in the expression, "the acid group-containing radically polymerizable compound different from the ethylenically unsaturated monomer and the internal crosslinking agent used in producing the water-absorbent resin described in the above (a)". In the case where the ethylenically unsaturated monomer used in producing the water-absorbent resin described in the above (a) is the acid group-containing radically polymerizable compound, as described in the above to obtain suitably effect of the present invention, effect of the present invention can be attained by making neutralization ratio of the acid group-containing radically polymerizable compound lower than that of the ethylenically unsaturated monomer used in producing the water-absorbent resin described in the above (a).

In addition, as a compound different from the ethylenically unsaturated monomer and the internal crosslinking agent used in producing the water-absorbent resin described in the above (a), there may be used an ethylenically unsaturated monomer containing at least one of a hetero atom other than oxygen, selected among nitrogen, sulfur, phosphorous, silicon and boron, in the above acid group-containing radically polymerizable compound. By using the above ethylenically unsaturated monomer, property of the water-absorbent resin particle can be modified more largely. More preferably, there may be used an ethylenically unsaturated monomer containing silicon, in particular, a silane group $(X_n Si (OR)_{4-n}$, where R represents methyl, ethyl, phenyl or acetoxy group; n is an integer of 1 to 3, provided when n is 1 or 2, R's may be the same or different), or phosphorous. In addition, in the case where the ethylenically unsaturated monomer, containing a hetero atom other than oxygen, is used as the acid group-containing radically polymerizable compound, amount of this ethylenically unsaturated monomer, containing a hetero atom other than oxygen, may be selected, as appropriate, depending on desired property, however, it is preferable to be equal to or lower than 50 parts by weight, more preferably 0.01 to 20 parts by weight and most preferably 0.1 to 10 parts by weight, relative to 100 parts by weight of total amount of the acid group-containing radically polymerizable compound.

A compound having low water-solubility among the above ethylenically unsaturated monomers may be added to the water-absorbent resin, by dispersing it into an aqueous solution containing the radical polymerization initiator and, if necessary, other radically polymerizable compounds, or by dissolving it into a hydrophilic organic solvent, and after mixing this into the aqueous solution. Alternatively, it may be added separately from the aqueous solution, by dissolving it into an organic solvent, if necessary. In this case, order of the addition of the ethylenically unsaturated monomer is not especially limited, and it may be added any of before or after the above aqueous solution.

The radically polymerizable compound may be used alone or may be used as a mixture of two or more kinds, and the combination in the latter case may be selected as appropriate depending on property etc. to be provided, and should not be limited especially.

Amount of the acid group-containing radically polymerizable compound to be used is in the range of 0.1 to 20 parts by weight, preferably 0.5 to 15 parts by weight, and more preferably 1 to 10 parts by weight, relative to 100 parts by weight of the water-absorbent resin. The amount of the radically polymerizable compound less than 0.1 part by weight would not enhance absorption capacity against pressure of the water-absorbent resin sufficiently. On the other hand, the amount of the acid group-containing radically polymerizable compound more than 20 parts by weight would lower absorption capacity of the resulting surface treated water-absorbent resin.

(c) Radical Polymerization Initiator

In the present invention, a radical polymerization initiator is preferably used in a) a mixing step of the water-absorbent resin, the acid group-containing radically polymerizable compound and water. The radical polymerization initiator is not especially limited, however, there may be included specifically a heat-degradable radical polymerization initiator or a photo-polymerization initiator.

Used amount of the radical polymerization initiator is not especially limited, however, in the present invention, it is preferably in the range of 0.01 to 20 parts by weight, more preferably 0.05 to 10 parts by weight, and still more preferably 0.1 to 5 parts by weight, relative to 100 parts by weight of the water-absorbent resin. The amount of the radical polymerization initiator within such a range can provide excellent productivity because of enhanced rate of a surface treatment reaction, as well as the water-absorbent resin superior in water-absorbing characteristics. In addition, the radical polymerization initiator may be used alone or may be used in combination of two or more kinds.

The term "heat-degradable radical polymerization initiator" is referred to as a compound which generates a radical by heating. A heat-degradable radical polymerization initiator having 10 hour half-life decomposition temperature of 0 to 120° C., more preferably 20 to 100° C., is preferably used in the present invention. In consideration of temperature condition during the irradiation of activated energy rays, one having 10 hour half-life decomposition temperature of 40 to 80° C. is particularly preferable. The 10 hour half-life decomposition temperature of lower than 0° C. (the lower limit) provides a too unstable state during storage, and on the other hand the 10 hour half-life decomposition temperature of over 120° C. (the upper limit) would provide too much chemical stability, which may lower reactivity.

The heat-degradable radical polymerization initiator is relatively inexpensive and the process and equipment for the production can be simplified because the strict light-shielding is not necessarily required, as compared with a compound commercially available as a photo-polymerization initiator. As typical examples of the heat-degradable radical polymerization initiator, there may be included a persulfate such as sodium persulfate, ammonium persulfate, potassium persulfate; hydrogen peroxide; and an azo compound such as 2,2'-azobis(2-amidinopropane)dihydrochloride, 2,2'-azobis[2-2(-imidazolin-2-yl)propane]dihydrochloride, 2,2'-azobis(2-methylpropionitrile). Among these, use of a persulfate such as sodium persulfate, ammonium persulfate, potassium persulfate; and an azo compound such as 2,2'-azobis(2-amidinopropane)dihydrochloride, 2,2'-azobis[2-2(-imidazolin-2-yl)propane]dihydrochloride, 2,2'-azobis(2-methylpropionitrile), which have a 10 hour half-life decomposition temperature of 40 to 80° C., can be preferably used. Among these, in particular, use of the persulfate is preferable in respect of excellent absorption capacity against pressure, fluid permeability and free swelling capacity. The persulfate may be used not only as one kind but also in combination of two or more kinds having different counter ions. It is preferable that the heat-degradable radical polymerization initiator is used in an amount of 0.001 to 5 part by weight, 0.001 to 3 part by weight, 0.001 to 1 part by weight, 0.005 to 0.7 part by weight, 0.25 to 0.5 part by weight, relative to 100 parts by weight of the water-absorbent resin, in this order.

In the present invention, there may be used a photo-polymerization initiator such as an oil-soluble benzoin derivative, a benzyl derivative, an acetophenone derivative, or an oil-soluble organic peroxide such as oil-soluble ketone peroxide, peroxy ketal, hydroperoxide, dialkyl peroxide, peroxy ester, peroxy carbonate. Such a photo-polymerization initiator may be a commercially available one, and there may be exemplified a commercial product, manufacture by Chiba Specialty Chemicals Co., Ltd.: Irgacure (registered trade name) 184 (hydroxycyclohexyl-phenylketone), Irgacure (registered trade name) 2959 (1-[4-(2-hydroxyethoxy)-phenyl]-2-hydroxy-2-methyl-1-propane-1-one) or the like. It is preferable that the photo-polymerization initiator is used in an amount of 0.001 to 1 part by weight, more preferably 0.005 to 0.5 part by weight, and still more preferably 0.01 to 0.1 part by weight, relative to 100 parts by weight of the water-absorbent resin.

The radical polymerization initiator of the present invention may be used as any of an oil-soluble type or a water-soluble type. The oil-soluble type radical polymerization initiator has features that decomposition rate is less labile to pH or ionic strength as compared with the water-soluble type radical polymerization initiator. However, because the water-absorbent resin is hydrophilic, in consideration of permeability to the water-absorbent resin, it is more preferable to use a water-soluble type photo-polymerization initiator. The term- "water-soluble" as used herein is referred to be soluble into water in equal to or more than 1% by weight, preferably equal to or more than 5% by weight, and more preferably equal to or more than 10% by weight in water (25° C.).

As a water-soluble radical polymerization initiator, there may be included preferably a radical polymerization initiator selected from a persulfate, hydrogen peroxide and an azo compound. Specifically, there may be included a persulfate such as ammonium persulfate, sodium persulfate, potassium persulfate; hydrogen peroxide; an azo compound such as 2,2'-azobis(2-amidinopropane)dihydrochloride, 2,2'-azobis[2-2(-imidazolin-2-yl)propane]dihydrochloride. Among these in particular, use of the persulfate is preferable in respect of excellent absorption capacity against pressure, fluid permeability and free swelling capacity of the water-absorbent resin subjected to surface treatment.

In combination with or instead of the above radical polymerization initiator, a percarbonate salt such as sodium percarbonate; a peracetic acid, a peracetate salt such as sodium peracetate may be used.

In the case where another radical polymerization initiator is used in combination, such as a heat-degradable radical polymerization initiator and a photo-polymerization initiator, in the present invention, used amount of the another radical polymerization initiator is in the range of 0 to 20 parts by weight, preferably 0 to 15 parts by weight, and particularly preferably 0 to 10 parts by weight, relative to 100 parts by weight of the water-absorbent resin. The use ratio corresponds to smaller amount than the heat-degradable radical polymerization initiator, for example, equal to or smaller than 1/2, further equal to or smaller than 1/10, and particularly equal to or smaller than 1/50 of weight ratio of the heat-degradable radical polymerization initiator.

(d) Mixing Step a) of the Water-Absorbent Resin, the Radically Polymerizable Compound and Water In surface treatment method of the present invention, the water-absorbent resin may be obtained by mixing 0.1 to 20 parts by weight of an acid group-containing radically polymerizable compound with a neutralization ratio of 0 to 60% by mol, and 5 to 20 parts by weight of water, relative to 100 parts by weight of a water-absorbent resin, in a mixing step a).

Conventionally, surface treatment of the water-absorbent resin has been generally carried out by formulating a surface crosslinking agent. Formulation of the surface crosslinking agent can provide chemically firmly bonding between a functional group present on the resin surface and the surface crosslinking agent, by which a stable surface crosslinked structure can be introduced on the resin surface. In addition, by selection of chain length of the surface crosslinking agent, as appropriate, distance between the surface crosslinks can be adjusted easily, and crosslink density can be controlled by adjustment of the formulation amount. However, in the present invention, by only using an acid group-containing radically polymerizable compound and, if necessary, a radical polymerization initiator, without formulating such a surface crosslinking agent, the water-absorbent resin can be surface-treated (modified), and specifically, a crosslinked structure can be introduced on the surface of the water-absorbent resin. Still more, by subjecting a water-absorbent resin composition obtained by mixing water, to irradiation treatment of activated energy rays and/or heating treatment, a crosslinked structure can be introduced efficiently on the surface of the water-absorbent resin particle, and also water-absorbing characteristics of the resulting suraface-treated (modified) water-absorbent resin can be improved. In addition to the above advantages, by using the acid group-containing radically polymerizable compound with low neutralization ratio, and by the addition of relatively large amount of water to the water-absorbent resin in the step a), a crosslinked structure can be introduced efficiently on the surface of the water-absorbent resin particle in the step b) to be described later. Therefore, it has also advantage that time for surface treatment (typically, irradiation time of activated energy rays and heating time) required to enhance saline flow conductivity (SFC) up to a desired level can be shortened, preferably to about several tens minutes, more preferably to about several minutes. SFC gives influence on fluid permeability after swelling of the surface-treated water-absorbent resin composition. That is, it can attain improvement of fluid permeability, sufficient diffusion of fluid in an absorbing body, increase of absorption amount for excretion fluid such as urine in use, and significantly enhanced effect of preventing fluid from leaking, in the case where, for example, the water-absorbent resin composition of the present invention is used as a part of the absorbing body of a disposable diaper. As characteristics required for the water-absorbent resin, there may be included absorption capacity, absorption speed, gel strength, suction force and the like. Among these characteristics, in surface treatment method of the present invention, surface reaction treatment time necessary to obtain desired saline flow conductivity (SFC) can be reduced significantly as compared with a conventional method. Although detailed mechanism thereof is not clear, it is considered to be brought about by enhancement of polymerization rate of the radically polymerizable compound.

The order of mixing of the radically polymerizable compound, water, and optionally the radical polymerization initiator to be added, to the water-absorbent resin is not especially limited. Therefore, each component may be mixed to the water-absorbent resin alone or may be mixed to the water-absorbent resin, by preparation of an aqueous solution containing the radical polymerization initiator and the radically polymerizable compound, in advance. However, in order to uniformly disperse both on the surface of the water-absorbent resin, it is preferable that the aqueous solution containing the radical polymerization initiator and the radically polymerizable compound are prepared in advance, and then it is mixed with the water-absorbent resin. After mixing the radical polymerization initiator and the radically polymerizable compound with the water-absorbent resin, the resulting mixture may be mixed with water.

The aqueous solution for dissolving the radical polymerization initiator and the radically polymerizable compound may contain a solvent other than water within the range not to impair solubility thereof, however, preferably only water is used, that is, the radical polymerization initiator and/or the radically polymerizable compound are used in an aqueous solution form in the absence of a hydrophobic organic solvent.

Amount of water to be mixed with the water-absorbent resin in the mixing step a) is in the range of 5 to 20 parts by weight, preferably 6 to 15 parts by weight, and more preferably 7 to 12 parts by weight, particularly 8 to 10 parts by weight, relative to 100 parts by weight of the water-absorbent resin (reduced to as a solid content of 100% by weight). Mixing water in such a range is preferable, because it can enhance surface treatment reaction rate by irradiation treatment of activated energy rays and/or heating treatment, as well as it may not require a large quantity of energy in a drying step after irradiation treatment of activated energy rays and/or heating treatment, and still more there is low risk of decomposition of the water-absorbent resin.

In the case where the acid group-containing radically polymerizable compound is mixed in a form of an aqueous solution, amount of water in the aqueous solution used may be adjusted so that amount of water in the resulting water-absorbent resin composition becomes within the above range. Mixing form of water with the water-absorbent resin is not necessarily limited to the case of a mixing form of an aqueous solution containing the acid group-containing radically polymerizable compound or the like. For example, water may be mixed after mixing the acid group-containing radically polymerizable compound and a radical polymerization initiator. Therefore, the water-absorbent resin composition may be obtained by directly mixing the radically polymerizable compound and a radical polymerization initiator to the resulting water-containing gel-like crosslinked polymer (water-absorbent resin) obtained by polymerization of monomer components, after subjecting it to drying till amount of water in the resulting water-absorbent resin composition becomes within the above range.

On the other hand, in order to enhance mixing property of the water-absorbent resin composition, it is preferable that a mixing co-agent is added to the water-absorbent resin composition. In this case, the mixing co-agent does not contain water. In addition, the addition timing of the mixing co-agent is not especially limited, however, it is preferably added at the same time or before the step a). In this case, the mixing co-agent other than water is not especially limited, as long as it is a water-soluble or water-dispersible compound other than an ethylenically unsaturated monomer or a water-soluble radical polymerization initiator, and it can suppress the agglomeration of the water-absorbent resin with water and enhance mixing property of the aqueous solution with the water-absorbent resin. However, the mixing co-agent is preferably a water-soluble or water-dispersible compound. As such a water-soluble or water-dispersible compound, there can be specifically used a surfactant, a water-soluble polymer, a hydrophilic organic solvent, a water-soluble inorganic compound, an inorganic acid, an inorganic acid salt, an organic acid, and an organic acid salt. As used herein, the term "water-soluble compound" is referred to as a compound having a solubility in 100 g of water at room temperature of equal to or higher than 1 g, preferably equal to or higher than 10 g. Because the addition of the mixing co-agent other than water can suppress the agglomeration of the water-absorbent resin with water, and induce the uniform mixing of the aqueous solution with the water-absorbent resin, in the subsequent step for irradiation treatment with activated energy rays, and heating treatment, the activated energy rays can be irradiated equally and evenly to the water-absorbent resin and thus the uniform surface crosslinking of the entire water-absorbent resin can be attained.

The use form of the mixing co-agent, when used, is not especially limited, and it may be used in a powdery form, or may be used in a dissolved, dispersed or suspended state in a solution, however, preferably, it is used in the form of an aqueous solution.

In addition, the order of the addition of the mixing co-agent, when it is used, is not also especially limited, and any of the methods may be used such as a method for adding the mixing co-agent to the water-absorbent resin and then adding and mixing the aqueous solution to the mixture; and a method for dissolving the mixing co-agent in the aqueous solution, and simultaneously mixing the resulting solution with the water-absorbent resin.

As a surfactant to be used herein, at least one surfactant selected from the group consisting of nonionic surfactants and anionic surfactants having an HLB of equal to or higher than 7 may be adopted. For example, there may be exemplified a surfactant, a sorbitan aliphatic ester, a polyoxyethylene sorbitan aliphatic ester, a polyglycerin aliphatic ester, a polyoxyethylene alkyl ether, a polyoxyethylene alkylphenol ether, a polyoxyethylene acyl ester, a sucrose aliphatic ester, a higher alcohol sulfate ester, an alkyl naphthalene sulfonate, an alkylpolyoxyethylene sulfate, dialkyl sulfosuccinate or the like. Among these surfactants, a polyoxyethylene alkyl ether may be preferably used. Number average molecular weight of the polyoxyethylene alkyl ether is preferably 200 to 100,000, and more preferably 500 to 10,000. The too large number average molecular weight would decrease solubility in water, makes it difficult to increase the added amount, and would increase viscosity of the solution, and thus provide inferior mixing property with the water-absorbent resin. On the other hand, the too small number average molecular weight would deteriorate effect as the mixing co-agent.

As the water-soluble polymer, there may be included, for example, polyvinyl alcohol, polyethylne oxide, polyethylene glycol, polypropylene glycol, polyacrylamide, polyacrylic acid, sodium polyacrylate, polyethylene imine, methyl cellulose, carboxymethyl cellulose, hydroxyethyl cellulose, hydroxypropyl cellulose, dextrin, sodium alginate, starch or the like. Among these polymers, polyethylene glycol is preferable. Number average molecular weight thereof, like in polyoxyethylene alkyl ether, is preferably 200 to 100,000, and more preferably 500 to 10,000.

As the hydrophilic organic solvent, there may be included alcohols such as methyl alcohol, ethyl alcohol, propyl alcohol, isopropyl alcohol, butyl alcohol, isobutyl alcohol, t-butyl alcohol and the like; ketones such as acetone, methylethyl ketone; ethers such as dioxane, alkoxy (poly) ethylene glycol, tetrahydrofuran; amides such as ε-caprolactam, N,N-dimethyl formamide; sulfoxides such as dimethyl sulfoxide; polyhydric alcohols such as ethylene glycol, diethylene glycol, propylene glycol, triethylene glycol, tetraethylene glycol, 1,3-propane diol, dipropylene glycol, 2,2,4-trimethyl-1, 3-pentane diol, glycerin, 2-butene-1,4-diol, 1,3-butane diol, 1,4-butane diol, 1,5-pentane diol, 1,6-hexane diol, 1,2-cyclohexane dimethanol, 1,2-cyclohexanol, trimethylol propane, diethanol amine, triethanol amine, polyoxypropylene, pentaerythritol, sorbitol. These hydrophilic organic solvents may be used either alone or in combination of two or more kinds.

As the water-soluble inorganic compound, there may be included an alkali metal salt such as sodium chloride, sodium hydrogen sulfate, sodium sulfate; an ammonium salt such as ammonium chloride, ammonium hydrogen sulfate, ammonium sulfate; an alkali metal hydroxide such as sodium hydroxide, potassium hydroxide; a polyvalent metal salt such as aluminum chloride, polyaluminium chloride, aluminum sulfate, potassium alum, calcium chloride, alkoxy titanium, zirconium ammonium carbonate, zirconium acetate; and a non-reducible alkali metal salt pH buffer agent such as hydrogencarbonate, dihydrogen phosphate, monohydrogen phosphate.

In addition, as the inorganic acid (salt), there may be exemplified specifically hydrochloric acid, sulfuric acid, phosphoric acid, carbonic acid, boric acid, and a salt thereof, for example, an alkali metal salt thereof, or an alkali earth metal salt thereof. As the organic acid (salt), there may be exemplified specifically acetic acid, propionic acid, lactic acid, citric acid, succinic acid, malic acid, tartaric acid, and a salt thereof, for example, an alkali metal salt thereof, and an alkali earth metal salt thereof.

Among the above exemplifications, polyoxyethylene alkyl ether, polyethylene glycol, a water-soluble polyvalent metal, sodium chloride, ammonium hydrogen sulfate, ammonium sulfate, sulfuric acid, and hydrochloric acid may be preferably used as the mixing co-agent.

These mixing aids may be used alone or in a mixture form of two or more kinds. In addition, the added amount of the mixing co-agent is not especially limited, as long as it can suppress aggregation of the water-absorbent resin with water, and enhance mixing property of the aqueous solution with the water-absorbent resin, as mentioned above, however, for example, it is preferably in the range of 0.01 to 40 parts by weight, more preferably 0.01 to 5 parts by weight, relative to 100 parts by weight of the water-absorbent resin. Alternatively, in the present invention, the mixing co-agent may be used in an amount of preferably 0 to 40% by weight, more preferably 0.01 to 30% by weight, and still more preferably 0.1 to 10% by weight, relative to total amount of the aqueous solution.

In the step a) relevant to the present invention, mixing condition of a water-absorbent resin, water, and a radically polymerizable compound, and optionally a radical polymerization initiator and a mixing co-agent, is not especially limited. For example, mixing temperature in the step a) may be preferably in the range of 0 to 150° C., 10 to 120° C., and 20 to 100° C. in this order. In this case, the mixing temperature over 150° C. would degrade the water-absorbent resin thermally. On the contrary, the mixing temperature below 0° C. would inhibit stable operation, caused by dew condensation of water. In the case where the mixing step is carried out at high temperature, the radical polymerization initiator is capable of acting thermally even under low amount of irradiation, and thus preferable. Therefore, in such a case, it is preferable to suppress excess leak of steam by sealing a mixing/irradiation system or the like. In addition, temperature of the water-absorbent resin and water before the step a) is also not especially limited, however, for example, temperature of the water-absorbent resin before the step a) may be preferably in the range of 0 to 150° C., 10 to 120° C. and 20 to 100° C. in this order. In this case, the temperature of the water-absorbent resin before the step a) over 150° C. would degrade the water-absorbent resin thermally. On the contrary, the mixing temperature below 0° C. would inhibit stable operation caused by dew condensation of water. In addition, temperature of the water before the step a) may be preferably in the range of 5 to 80° C., more preferably 10 to 60° C. and particularly preferably 20 to 50° C. In this case, the temperature of water before the step a) over 80° C. would not provide effect of the present invention, because of excessive evaporation of water before the mixing step a), and making it impossible to mix sufficient amount of water with the water-absorbent resin. On the contrary, the mixing temperature below 5° C. would inhibit stable operation caused by dew condensation of water. Still more, mixing time in the step a) is not especially limited, as long as it is such time as providing uniform mixing thereof. Specifically, the mixing time may be preferably in the range of 0.1 second to 60 minutes, more preferably 1 second to 30 minutes, still more preferably 2 second to 20 minutes and most preferably 5 second to 10 minutes. In this case, the mixing time below the lower limit would not provide uniform mixing of the water-absorbent resin, water and the radically polymerizable compound and the like. On the contrary, the longer mixing time than necessary over the upper limit would provide little progress of surface treatment by irradiation treatment of activated energy rays and/or heating treatment, because of little permeability of excessive water inside the water-absorbent resin.

As a method for obtaining the water-absorbent resin composition, by mixing a water-absorbent resin, a radically polymerizable compound, a radical polymerization initiator and water, there may be included a method for mixing by using an ordinary mixing device, for example, a V-shape mixer, a ribbon-type mixer, a screw-type mixer, a rotation circular plate-type mixer, an air-current-type mixer, a batch-type kneader, a continuous-type kneader, a paddle-type mixer, a plow-type mixer.

(e) Step (b) for Polymerizing the Acid Group-Containing Radically Polymerizable Compound In the step b) in present invention, an acid group-containing radically polymerizable compound is polymerized to a water-absorbent resin. As used herein, a method for polymerizing the acid group-containing radically polymerizable compound to a water-absorbent resin is not especially limited. Preferably, the step b) may comprise a step for irradiating activated energy rays to the mixture obtained in the step a), and/or a step for heating the mixture obtained in the step a). Specifically, the acid group-containing radically polymerizable compound mixed in the water-absorbent resin is polymerized by using a radical generation means such as irradiation of activated energy rays and/or heating, preferably on the surface and/or at the vicinity thereof of the water-absorbent resin. In this step b), either a step for irradiating activated energy rays to the mixture obtained in the step a) or a step for heating the mixture obtained in the step a) may be carried out, alternatively a step for irradiating activated energy rays to the mixture obtained in the step a) and a step for heating the mixture obtained in the step a) may be carried out in combination.

This polymerization can increase crosslink density at the vicinity of the surface as compared with that inside of the water-absorbent resin, and enhance desired characteristics in practical use of the water-absorbent resin, such as absorption capacity against pressure, fluid permeability. Hereinafter, a step for irradiating activated energy rays to the mixture, and/or a step for heating the mixture will be described. The present invention, however, is not limited thereto.

(e-1) Irradiation of Activated Energy Rays

It has been known that in the production of a water-absorbent resin, polymerization rate is enhanced by irradiation of activated energy rays. For example, by formulating an internal crosslinking agent and a photo-polymerization initiator to a polymerizable monomer component, and irradiating the resultant mixture with activated energy rays such as ultraviolet rays, electron beams, or γ rays, an insoluble water-absorbent resin having internal crosslink can be prepared. On the other hand, as a method for surface treatment of a water-absorbent resin, it has been also known a method for forming surface crosslink by using a surface crosslinking agent and promoting a relevant reaction under heat condition. As such surface crosslink of a water-absorbent resin, there may be included a compound, having a plurality of functional groups in one molecular, such as a polyhydric alcohol, a polyvalent glycidyl ether, a haloepoxy compound, a polyvalent aldehyde. Generally, heating at 100 to 300° C. promotes a reaction between these functional groups and a carboxyl group present on the surface of the water-absorbent resin, to form a crosslinked structure on the surface of a water-absorbent resin. The present invention, however, is capable of carrying out surface treatment of a water-absorbent resin by the presence a polymerizable monomer and a radical polymerization initiator, and by irradiation of the activated energy rays, even in the absence of such a surface crosslinking agent, and thus providing a water-absorbent resin with excellent water-absorbing characteristics. It may be considered that a crosslinked structure can be formed on the surface of a water-absorbent resin by such surface treatment.

In the present invention, the irradiation of the activated energy rays may be carried out during the course of mixing a water-absorbent resin, water, an acid group-containing radically polymerizable compound, and optionally a radical polymerization initiator, or subsequent to the mixing of two or more components thereof. From the viewpoint of providing a uniform surface crosslink, however, it is preferable that a water-absorbent resin composition containing a water-absorbent resin, water, an acid group-containing radically polymerizable compound, and optionally a radical polymerization initiator is obtained first and then the resulting water-absorbent resin composition is subjected to irradiation with activated energy rays.

As the activated energy rays, one member or two or more members of ultraviolet rays, electron beams, and γ rays may be included. Among these activated energy rays, ultraviolet rays and electron beams are preferable. In consideration of influence of activated energy rays on a human body, ultraviolet rays is more preferable, and ultraviolet rays having a wavelength of equal to or shorter than 300 nm, and particularly preferably 180 to 290 nm is still more preferable. As for irradiation condition, when ultraviolet rays are used, irradiation intensity is preferably in the range of 3 to 1000 mW/cm$^2$ and dose thereof is preferably in the range of 100 to 10000 mJ/cm$^2$.

As a device for irradiation of ultraviolet rays, a high-pressure mercury-vapor lamp, a low-pressure mercury-vapor lamp, a metal halide lamp, a xenon lamp, a halogen lamp or the like may be exemplified. So long as ultraviolet rays are irradiated, and ultraviolet rays of a wavelength of equal to or shorter than 300 nm is irradiated, other radiation rays or wavelength may be contained, and the procedure is not especially limited. In the case where electron beams are used, preferably voltage of acceleration is in the range of 50 to 800 kV, and absorbed dose is set to a level in the range of 0.1 to 100 Mrad. In the case of a method described in example to be described later, duration of irradiation of activated energy rays is preferably equal to or longer than 0.1 minute and less than 60 minutes, more preferably equal to or longer than 0.5 minute and less than 20 minutes, still more preferably equal to or longer than 0.5 minute and less than 5 minutes, and particularly preferably equal to or longer than 1 minute and less than 3 minutes, although it depends on amount of a water-absorbent resin to be treated. This duration possibly exceeds 60 minutes when a conventional surface crosslinking agent is used, but the present invention is capable of reducing the duration of the surface crosslinking treatment, when compared at the same crosslink density.

In the surface treatment effected by irradiation of the activated energy rays according to the present invention, heating is not required. It is also possible to carry out the irradiation of activated energy rays under heating, resulting in providing a water-absorbent resin with excellent water-absorbing characteristics. Heating temperature is in the range of preferably 0 to 150° C., more preferably 10 to 120° C., still more preferably room temperature to 100° C., and particularly preferably 50 to 100° C. The irradiation of activated energy rays may generate radiation heat. In this case, the irradiation of activated energy rays may result in to be carried out under heating. In the present invention, because surface treatment is carried out by the irradiation of activated energy rays, heating is used only as a supporting means. Therefore, the present invention allows the treatment temperature to be set at a lower level than a conventional surface treatment temperature. A method for heating may include a method for introducing heated vapor inside an irradiation device of activated energy rays; a method for heating around an irradiation device of activated energy rays with a jacket or the like; a method for heating by utilizing radiation heat in irradiation of activated energy rays; a method for irradiation of activated energy rays to a preheated water-absorbent resin.

During the irradiation of activated energy rays, a water-absorbent resin is preferably kept stirred. By this stirring, it is made possible to irradiate uniformly a mixture of a radical polymerization initiator and a water-absorbent resin with activated energy rays. As a device for stirring a water-absorbent resin during the irradiation of activated energy rays, there may be included a shaking-type mixer, a shaking feeder, a ribbon-type mixer, a conical ribbon-type mixer, a screw-type mixing extruder, an air flow-type mixer, a batch-type kneader, a continuous-type kneader, a paddle-type mixer, a high-speed fluidizing-type mixers, a buoyant fluidizing-type mixer or the like.

In addition, by making a water-absorbent resin flow in a device having a cylinder-like or a box-like shape, a activated energy rays may be irradiated from the surrounding of the device. In this case, in order to make the mixture flow, pressure of vapor such as air may be utilized, as used in air conveyance of powders. In the case of utilizing air, it is preferable that air is humidified to prevent drying of a water-absorbent resin composition. Irradiation of activated energy rays from a multiple directions is capable of providing uniform surface treatment in a short period of time. A material composing the above device is not especially limited, as long as it is a material not to impair irradiation of activated energy rays to a water-absorbent resin composition, however, for example, quartz glass or the like may be exemplified.

In general, it has been known that a reaction using radials as activated species is inhibited by oxygen. However, in a production method of the present invention, property of the surface treated water-absorbent resin has not been lowered, even in the presence of oxygen in a system. This means that inert atmosphere is not required essentially in irradiation of activated energy rays.

(e-2) Heating

As described above, polymerization can be attained by heating an acid group-containing radically polymerizable compound to be mixed with a water-absorbent resin. In the case where the polymerization is carried out by only heating, separate installment of irradiation equipment of activated energy rays may become unnecessary, and thus advantageous in view of designing of production equipment. In addition, it is capable of enhancing absorption characteristics (in particular, absorption capacity against pressure/fluid permeability) of the resulting surface treated water-absorbent resin, at a low cost and by safe means.

A mixture obtained in the step a) may be prepared under similar conditions to in irradiation of activated energy rays as mentioned above, and a radical polymerization initiator is not an essential component. It is preferable that an acid group-containing radically polymerizable compound, water, and optionally a radical polymerization initiator are mixed to a water-absorbent resin in specific amounts as mentioned above. In addition, it is preferable that the mixture is heated under specific temperature condition.

In the case where the above step b) is a step for heating the resulting mixture (water-absorbent resin composition), radical generation can be controlled by preparation of a mixture obtained in the step a), under different conditions from those in irradiation of activated energy rays as mentioned above. Explanation will be given below on preferable embodiments in the heating. Hereinafter, and embodiment by using a radical polymerization initiator will be described. Use of the radical polymerization initiator, however, can be omitted, as mentioned above.

By mixing with an aqueous solution (hereafter may be referred to as "treatment solution") containing a water-absorbent resin, a radical polymerization initiator, an acid group-containing radically polymerizable compound and water, a water-absorbent resin composition is obtained as a mixture. Then, this water-absorbent resin composition is subjected to heating treatment. By this heating, it is estimated that a crosslinked structure is introduced on the surface of the water-absorbent resin. Technical scope of the present invention should not be limited only to such an embodiment; the order of the addition of each of the components present in a reaction system, or the timing of the addition of each of the components and heating treatment is not especially limited, such as a radical polymerization initiator, an acid group-containing radically polymerizable compound and water may be added separately to a water-absorbent resin (base polymer), or they may be added to a water-absorbent resin (base polymer) under heat treatment.

In the present invention, increase or decrease of water content before and after the step for polymerization of an acid group-containing radically polymerizable compound (hereafter may be referred to also as "surface treatment step") is not especially limited, however, water content of a water-absorbent resin after the surface treatment step is not preferably less than, more preferably more than, that before the surface treatment step. In the case where heating treatment is carried out after mixing a water-absorbent resin with a treatment solution, "water content of a water-absorbent resin before the surface treatment step" means water content after mixing the treatment solution and before the heating treatment, and "water content after the surface treatment step" means water content after the heating treatment. In addition, in the case where the mixing of a water-absorbent resin and a treatment solution is carried out under the heating treatment, "water content of the water-absorbent resin before the surface treatment step" means water content before the heating treatment, and "water content after the surface treatment step" means water content after the heating treatment. Therefore, in industrial production equipment, water content of the water-absorbent resin in entering reaction equipment for carrying out a surface treatment reaction corresponds to "water content before the surface treatment step", and water content of the water-absorbent resin coming out reaction equipment for carrying out the surface treatment reaction corresponds to "water content after the surface treatment step".

In addition, it is preferable that the surface treatment step of the present invention is carried out in the absence of a hydrophobic organic solvent. It is because presence of the hydrophobic organic solvent in the surface treatment step of the present invention would provide no absorption of a part of a treatment solution into a water-absorbent resin, and results in dispersion thereof into the hydrophobic organic solvent, to make the surface treatment proceed with difficulties. The term "hydrophobic organic solvent" means an organic solvent with a solubility to water (20° C.) of equal to or lower than 5 g/100 g. As the hydrophobic organic solvent, there may be included, for example, an aliphatic hydrocarbon compound such as n-pentane, cyclopentane, n-hexane, cyclohexane, n-heptane, methylcyclohexane, n-octane; an aromatic hydrocarbon compound such as benzene, toluene, xylene; or the like.

The heating treatment is preferably carried out at a temperature of over 80° C. and equal to or lower than 250° C., more preferably 90 to 180°, and still more preferably 100 to 150° C. When the temperature of the heating treatment is equal to or higher than 80° C., surface treatment proceeds efficiently. On the other hand, when the temperature of the heating treatment is equal to or lower than 250° C., thermal degradation of a water-absorbent resin can be prevented. Heating a water-absorbent resin in this way is capable of producing a surface treated water-absorbent resin excellent in water-absorbing characteristics (in particular, absorption capacity against pressure/fluid permeability) at a low cost and by safe means.

In order to carry out surface treatment of a water-absorbent resin by heating, a water-absorbent resin containing each of the above components may be heated. Specific conditions of atmosphere in such heating treatment is not especially limited, however, it is preferable that heating is carried out under relatively high humidity atmosphere. Specifically, it is preferable that heating is carried out in saturated steam and/or overheated steam. It is preferable that atmosphere, in the case of heating at a temperature of equal to or higher than 100° C., more preferably of equal to or higher than 250° C. is filled with overheated steam, and it is more preferable to directly heat a water-absorbent resin by using overheated steam. In addition, pressure of atmosphere in heating treatment may be any of reduced pressure, normal pressure, and under pressure, and not especially limited, however, it is preferably in the range of 1013 to 43030 hPa, more preferably 1013 to 14784 hPa, still more preferably 1013 to 10498 hPa, and particularly preferably 1013 to 4906 hPa. Still more, relative humidity of the atmosphere is preferably in the range of 50 to 100% RH, more preferably 70 to 100% RH, still more preferably 90 to 100% RH, particularly preferably 95 to 100%RH, and most preferably 100% RH (saturated steam). In addition, oxygen concentration in the atmosphere in heating treatment is preferably in the range of 0 to 25% by volume, more preferably 0 to 15% by volume, still more preferably 0 to 10% by volume, still further preferably 0 to 5% by volume, particularly preferably 0 to 1% by volume, and most preferably 0 to 0.5% by volume. Adjustment of the oxygen concentration in atmosphere to relatively low concentration is capable of preventing oxidative degradation of a water-absorbent resin in heating, and thus preferable.

Heating time in carrying out heating treatment is also not especially limited, however, it is preferably in the range of 1 to 90 minutes, more preferably 2 to 60 minutes, and still more preferably 3 to 30 minutes. The heating time equal to or longer than 1 minute is capable of introducing a crosslinked structure on the surface of a water-absorbent resin; on the other hand, the heating time equal to or shorter than 90 minute is capable of preventing degradation of a water-absorbent resin caused by heating.

In addition, in the surface treatment step of a surface treatment method of the present invention, irradiation treatment of activated energy rays, such as radiation ray or electron beams, ultraviolet rays, electromagnetic beams and the like may be used, in addition to the above heating treatment.

Apparatus used in heating treatment, in the case where a water-absorbent resin is surface treated by heating treatment, is not especially limited, and a known drier may be used. For example, there may be preferably used a dryer of a conduction heat transfer type, a radiation heat transfer type, a hot air transfer type, a dielectric heating type, and specifically, there is preferably used a dryer of a belt type, a thin-type stirring type, a fluid layer type, an air flow type, a rotation type, a mixing type, an infrared ray type, or an electron beam type.

(f) Other Treatment

After the irradiation of the activate energy rays, a water-absorbent resin may be optionally subjected to heat treatment at a temperature of 50 to 250° C. for the purpose of drying or the like.

In addition, after the irradiation of the activate energy rays, surface crosslink may be formed by the use of any of conventionally well-known surface crosslinking agents such as a polyhydric alcohol, a polyvalent epoxy compound, an alkylene carbonate.

In a surface treatment method of the present invention, a water-absorbent resin may be added with an agent for enhancing fluid permeability, after the irradiation of the activated energy rays. As an example of the agent for enhancing fluid permeability, there may be included minerals such as talc, kaolin, fuller's earth, bentonite, activated clay, baryte, natural asphaltum, strontium ore, ilmenite, pearlite; aluminum compounds such as aluminum sulfates 14-18 hydrates (or anhydrides), potassium aluminum sulfates 12 hydrate, sodium aluminum sulfate 12 hydrate, aluminum chloride, aluminum polychloride, aluminum oxide or the like, and an aqueous solution thereof; other polyvalent metal salts; hydrophilic amorphous silicas (such as, for example, the product of the dry method made by Tokuyama K.K. and sold under the trademark designation of "Reolosil QS-20" and the products of the precipitation method made by DEGUSSA Corp. and sold under the trademark designation of "Sipernat 22S and Sipernat 2200"); oxide composites such as silicon oxide.aluminum oxide.magnesium oxide composite (such as, for example, the product of ENGELHARD Corp. sold under the trademark designation of "Attagel #50), silicon oxide.aluminum oxide composite, silicon oxide.magnesium oxide composite or the like; or the like. Such an agent for enhancing fluid permeability is mixed in an amount of 0 to 20 parts by weight, more preferably 0.01 to 10 parts by weight, and particularly preferably 0.1 to 5 parts by weight, relative to 100 parts by weight of a water-absorbent resin after surface treatment. The agent for enhancing fluid permeability may be added in a form of an aqueous solution when it is soluble in water, or in a form of powder or slurry when it is insoluble in water. Other additives such as an antibacterial agent, a deodorant, a chelating agent may be added, as appropriate, in an amount within the above range.

(g) Surface Treated Water-Absorbent Resin

In the present invention, by applying to the water-absorbent resin a surface treatment method by polymerization of an acid group-containing radically polymerizable compound, the surface treated water-absorbent resin can be produced, where absorption capacity against pressure of the resulting water-absorbent resin can be enhanced.

In addition, as for the surface treated water-absorbent resin obtained by the present invention, water content of a water-absorbent resin after the surface treatment step preferably increases as compared with that before the surface treatment step. In particular, in the case where heating treatment is carried out by using saturated steam in the step b), the increase is observed significantly. The water content of the surface treated water-absorbent resin obtained after the surface treatment step is preferably in the range of 1 to 50% by weight, more preferably 2 to 45% by weight, still more preferably 3 to 40% by weight, and particularly preferably 5 to 30% by weight, most preferably 5 to 20% by weight. In addition, amount of increase in the water content before and after the surface treatment step is not especially limited, however, increase in water content before and after the surface treatment step [=(water content after the surface treatment step)−(water content before the surface treatment step)] is preferably in the range of 0.1 to 40% by weight, more preferable to increase 0.5 to 30% by weight, still more preferable to increase 1 to 20% by weight, and particularly preferable to increase 2 to 15% by weight. When the water content or amount of the increase in the water content of a surface treated water-absorbent resin is equal to or higher than the lower limit of the above range, effects by the present invention can be sufficiently fulfilled, and the surface treated water-absorbent resin superior in water-absorbing performance, such as absorption capacity against pressure or fluid permeability, can be obtained.

In addition, in the surface treated water-absorbent resin obtained by the present invention, residual monomer content after the surface treatment step can be significantly reduced. Particularly, amount of monomer which remains in the case of irradiating a water-absorbent resin with activated energy rays in the step b) can be largely reduced. As used herein, the term "monomer" used in the residual monomer content is referred to as a monomer which remain in a surface treated water-absorbent resin. Typically, the monomer includes a monomer of derived from a water-absorbent resin which remains after the production thereof, and an acid group-containing radically polymerizable compound which remains without being polymerized after the step b). The residual monomer content in the surface treated water-absorbent resin without any purification after the step b) (surface treatment step) is preferably in the range of 0 to 300 ppm by weight, more preferably 0 to 200 ppm by weight, still more preferably 0 to 100 ppm by weight, relative to 100 parts by weight of a water-absorbent resin. Within such a range, the water-absorbent resin according to the present invention can be advantageously applied to a disposable diaper or the like in hygienic material field. The residual monomer content, as used herein, is a value determined by the method described in Example.

It has been hitherto known that a water-absorbent resin, when surface crosslink is formed therein, shows slight decrease in free swelling capacity but shows enhanced capability to retain absorbed fluid even in a pressurized state, namely enhanced absorption capacity against pressure. According to a method of this invention, absorption capacity against pressure of 4.83 kPa of the water-absorbent resin is increased by equal to or more than 1 g/g, preferably equal to or more than 8 g/g, more preferably equal to or more than 10 g/g, and still more preferably equal to or more than 12 g/g, even without using a surface crosslinking agent. This fact may be considered to indicate that by the method of the present invention, a crosslinked structure is introduced on the surface of the water-absorbent resin. As for properties after the modification, this increase is preferably by equal to or more than 8 g/g, more preferably equal to or more than 12 g/g, still more preferably equal to or more than 15 g/g, and particularly preferably equal to or more than 20 g/g, most preferably equal to or more than 22 g/g. In addition, the surface treated water-absorbent resin, produced by being applied to surface treatment method of the present invention, can exhibit absorption capacity against pressure of 4.83 kPa 8 to 40 g/g. It should be noted that the upper limit is not especially limited, however, it may be the case where even about 40 g/g is sufficient in view of cost-up caused by production difficulty. As value of absorption capacity against pressure, value measured by a method described in examples is adopted.

Free swelling capacity (GV) is preferably equal to or larger than 8 g/g, more preferably equal to or larger than 15 g/g, still more preferably equal to or larger than 20 g/g, and particularly preferably equal to or larger than 25 g/g. The upper limit is not especially limited, however, it is preferably equal to or smaller than 50 g/g, more preferably equal to or smaller than 40 g/g, and still more preferably equal to or smaller than 35 g/g. The case of the free swelling capacity (GV) of smaller than 8 g/g would result in too low absorption amount and is not suitable to be used as a hygienic material such as a diaper or the like. In addition, the case of the free swelling capacity (GV) of larger than 50 g/g would result in weak gel strength and could not provide a water-absorbent resin with excellent fluid permeability. As value of the free swelling capacity, value measured by a method described in examples is adopted.

Saline flow conductivity (SFC) is preferably equal to or higher than 10 (unit: $10^{-7} \cdot cm^3 \cdot s \cdot g^{-1}$), more preferably equal to or higher than 30 (unit: $10^{-7} \cdot cm^3 \cdot s \cdot g^{-1}$), and still more preferably equal to or higher than 50 (unit: $10^{-7} \cdot cm^3 \cdot s \cdot g^{-1}$). The upper limit is not especially limited, however, it is preferably equal to or lower than 500 (unit: $10^{-7} \cdot cm^3 \cdot s \cdot g^{-1}$). The case of the saline flow conductivity (SFC) of low than 10 (unit: $10^{-7} \cdot cm^3 \cdot s \cdot g^{-1}$) would result in insufficient fluid permeability and could not permeate fluid sufficiently into an absorbing body, to lower absorption amount for excretion fluid such as urine or the like in usage. As value of the saline flow conductivity, value measured by a method described in examples is adopted.

A shape of the resulting surface treated water-absorbent resin in accordance with the present invention may be adjusted, as appropriate, depending on treatment conditions such as a shape of the water-absorbent resin before treatment, granulation/formation after treatment or the like, however, it is in general a powder form. Such powders may have a weight average particle diameter (specified by sieve classification) in the range of 10 to 1,000 μm, and preferably 200 to 600 μm. Content of particles with the weight average particle diameter of 150 to 850 μm may be preferably in the range of 90 to 100% by weight, and still more preferably 95 to 100% by weight, relative to the water-absorbent resin. In addition, logarithmic standard deviation of particle size distribution (σζ) is preferably 0.23 to 0.45, and more preferably 0.25 to 0.35.

The surface-treated water-absorbent resin (preferably powdery water-absorbent resin; similar to the following) of the present invention preferably has a sodium atom width as determined by EPMA (hereinafter referred to simply as "Na atom width") in the range of 5 to 50 μm. If the Na atom width is less than 5 μm, a polymerization (surface treatment) speed would be lowered, because of the use of a carboxyl group-containing radically polymerizable compound having a high neutralization ratio. On the other hand, if it exceeds 50 μm, the resultant surface-treated water-absorbent resin would have decreased neutralization ratio to degrade absorption capacity, because a carboxyl group-containing radically polymerizable compound having a low neutralization ratio (a high content of acid group) is used for polymerization in an excess amount. The surface-treated water-absorbent resin having a Na atom width within such a range as above can be easily produced by suitably selecting a kind (particularly, in terms of neutralization ratio) of carboxyl group-containing radically polymerizable compound and also by controlling the used amount thereof. In addition, by satisfying the characteristics b), C), and d), the water-absorbent resin would be resistant to damage and have absorption capacity advantageous for a sanitary material such as disposable diaper.

The surface-treated powdery water-absorbent resin of the present invention is obtained by polymerizing a monomer component having as a main component a carboxyl group-containing radically polymerizable compound such as acrylic acid and metal salts thereof. A carboxyl group (—COOH) or metal salts thereof (—COOM; wherein M stands for a metal atom) is present over the entire water-absorbent resin of the present invention (including inside and surface thereof). Accordingly, uniformity by the surface crosslinking treatment can be examined by determining a concentration of a carboxyl salt and thus a concentration of a metal atom of the resultant surface-treated water-absorbent resin. By determining a concentration of a metal atom toward the center of the resin by polishing the surface thereof, a thickness of a surface-treated layer where the surface treatment proceeds can be determined by its change in the concentration.

In the present invention, a thickness of a surface-treated layer where the surface treatment proceeds is determined based on a Na atom width as determined by EPMA in the surface-treated powdery water-absorbent resin of the present invention in accordance with the above principle. Specifically, the surface-treated powdery water-absorbent resin of the present invention has a sodium atom width as determined by EPMA in the range of 5 to 50 μm. Since a water-absorbent resin having such a property has a uniform crosslinking and have an appropriate surface hardness, it excels also in absorption capacity. As used herein, "EPMA (Electron Probe Micro Analysis)" is a method for detecting and identifying a constitutional element (sodium element) in a tiny area (about 1 μm³) under irradiation with electron beams, and also for analyzing a ratio (concentration) of each the constitutional elements. In the present invention, a concentration of a sodium element is determined from a surface toward inside of a water-absorbent resin in accordance with the above principle. Then, a difference between a thickness when the concentration begins to rise and a thickness when the concentration begins to show a stationary state is determined, which value is referred to as "a sodium atom width as determined by EPMA (μm)". More specifically, the value, "a sodium atom width as determined by EPMA (μm)" is determined by the following method.

<Determination of Sodium Atom Width as Determined by EPMA (μm)>

1. Preparation of Sample 3 g of bisphenol F type epoxy resin (manufactured by Japan Epoxy Resins Co., Ltd., and sold under the trademark designation of Epicoat 807), 2 g of modified heterocyclic amine product (manufactured by Japan Epoxy Resins Co., Ltd., and sold under the trademark designation of Epomate N001) are separately weighed in paper cups. After the cups are placed in a drier at 90° C. for 30 minutes, the 2 solutions therein are mixed together. The resultant mixture is poured into a photographic film-storing vessel (polyethylene vessel) having an inner diameter of 15 mmΦ in which about 0.03 g of a water-absorbent resin fraction having a particle size of 300 to 600 μm classified by a measurement method for particle size distribution was placed in advance, and then defoamed under reduced pressure. After the vessel was cooled in iced water for a few minutes, the epoxy resin therein is cured, to embed the water-absorbent resin in the epoxy resin. In this case, the curing is carried out at 40° C. for one hour and then at 65° C. overnight.

Then, the resultant epoxy resin having the water-absorbent resin embedded therein is taken out from the vessel, and polished with a polishing paper (SiC). In this case, the polishing process is carried out by polishing the water-absorbent resin in lubricant oil for machine as lubricant with a polishing paper No. 800 for about one minute to expose a cross section thereof, and then further polishing it with a polishing paper No. 1500 for about 30 minutes. Subsequently, carbon deposition is subjected to the polished epoxy resin.

2. Determination by EPMA

The section of the sample prepared as above is examined by EPMA (Electron Probe Microanalyzer; manufactured by Shimazu Corporation, and sold under the trademark designation of EPMA-1610). The examination is carried out via surface analysis (mapping). The examination conditions are as follows: Accelerating voltage=15 kV, Beam size=1 μm, Beam Current=0.05 μA. The examination by mapping is carried out under the following conditions: Measuring time=40 msec, Data Point=200 points both for X and Y axes, Step size=0.5 μm both for X and Y axes, Area size=100 μm, Measure Type=One-Way, Start Type=Center, Wavelength of character X-rays (Kα rays) of Na=11,8950 Å. The element examined is Na (analysing crystal: RAP (Rubidium acid phtharate)). The observation during the examination is carried out under Backscatter Electron Image (BEI). The mapping is carried out at 3 positions per sample.

3. Analysis

The date obtained in the above 2. are analyzed as follows.

1) The two-dimensional date about Na atom obtained about in the above 2. are converted into text data by using EPMA Analyzing software manufactured by Shimazu System Development Corp. (support tool for creating report for EPMA: Report assistant EX).

2) A position to be analyzed is determined. In this case, the position to be analyzed is determined by:

I. drawing a tangent line at one position on a surface of water-absorbent resin particle, wherein the phrase "one position on a surface of water-absorbent resin particle" is referred to a position present on a surface of water-absorbent resin particle and having counts of Na atom exceeding 10;

II. drawing a perpendicular line against the tangent line drawn in the above I.; and III. drawing a line A within ±5° against the perpendicular line drawn in the above II.

3) A shift average of 5 positions at 0.5 μm intervals is calculated by using 5 data for counts of Na atom at 5 positions at 0.5 μm intervals determined for analysis in the above 2). More specifically, counts of Na atom are recorded along the "line A" obtained in the above 2) from 10 μm outside of a surface of a water-absorbent resin particle to 50 μm inside thereof at 0.5 μm intervals.

In this step, a shift average of 5 positions at 0.5 μm intervals at $n^{th}$ position can be calculated by using 5 data for counts of Na atom in accordance with the following formula.

$$\text{(Shift average of 5 positions at 0.5 μm intervals at } n^{th} \text{ position) (counts)} = \text{(Total counts of Na atom at } n^{th}, n+1^{th}, n+2^{th}, n+3^{th}, \text{ and } n+4^{th} \text{ positions)}/5 \quad \text{[Formula 2]}$$

4) For the shift average calculated in the above 3), an inclination of counts of Na atom against distance is determined by derivation.

In this step, an inclination of counts of Na atom at $n^{th}$ position against distance can be calculated in accordance with the following formula.

$$\text{(Inclination of counts of Na atom at } n^{th} \text{ position against distance) (counts/μm)} = (C_{n+1} - C_n)/0.5 \quad \text{[Formula 3]}$$

In the above formula, $C_{n+1}$ stands for a shift average of 5 positions at 0.5 μm intervals at $n+1^{th}$ position (counts); and $C_n$ stands for a shift average of 5 positions at 0.5 μm intervals at $n^{th}$ position (counts).

5) The inclination against distance obtained in the above 4) is plotted.

6) A maximum inclination obtained in the above 4) is decided in an area where counts of Na atom on the surface of the water-absorbent resin particle increases.

7) A width (distance) between positions which first show a value more than tenth of the maximum decided in the above 6) is calculated. (In the case of the following case, 8.5-1=7.5 μm.)

8) The analysis described in the above 1) to 7) is repeated ten times per one determination by mapping in EPMA (n=10).

9) 6 values which is obtained by excluding 4 values, i.e., the maximum, a value next to the maximum, minimum, and a value next to the minimum, from all 10 values obtained in the above 8), are averaged.

10) The analysis described in the above 1) to 9) is repeated three times per one sample, to obtain 3 determinations.

11) The determinations obtained in the above 10) are averaged, which is called as "a sodium atom width as determined by EPMA (μm)"

Figure 2A:
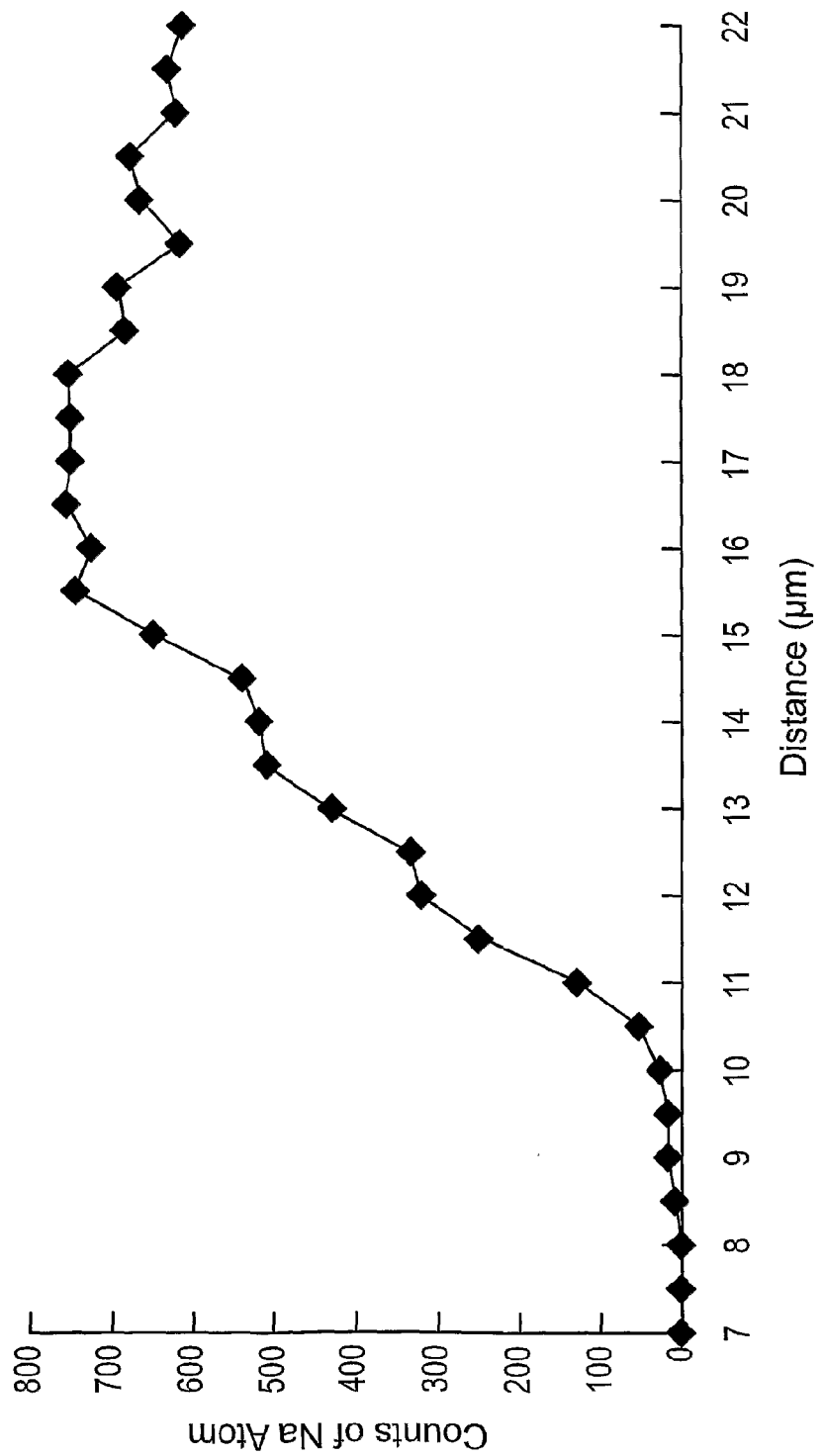
FIG. 2A is a graph showing the counts of Na atom present at 0.5 μm intervals against distance (thickness).
Figure 2B:
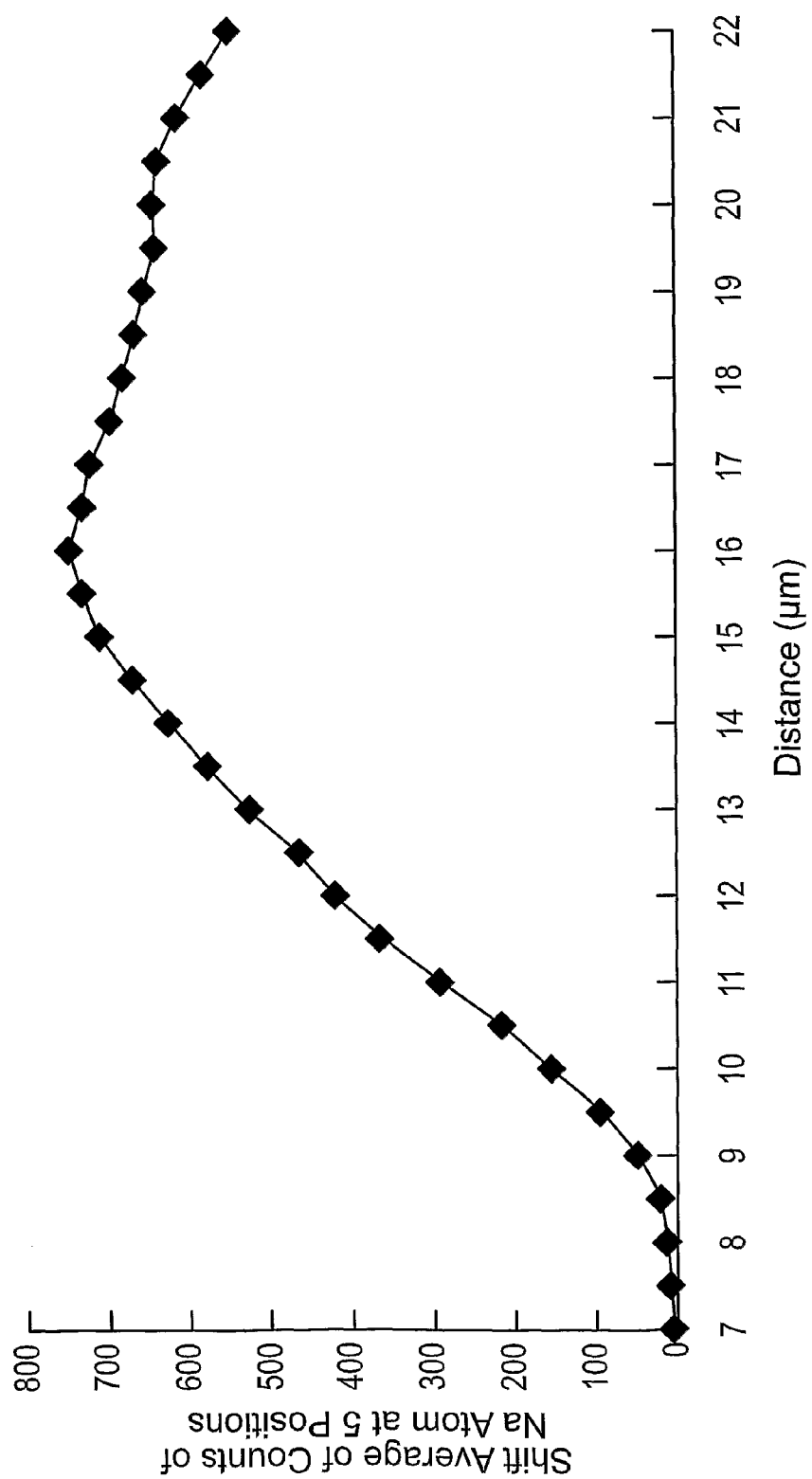
FIG. 2B is a graph showing the average counts of Na atom against distance (μm).

This method will be described in detail when the following data are obtained in the above 2), for example. First, in the step 2), counts of Na atom present at 0.5 μm intervals as measured distance (thickness) are obtained as shown in the left column in the Table A below. A graph obtained by plotting the counts of Na atom present at 0.5 μm intervals as measured distance (thickness) is shown in FIG. 2A. Then, in the step 3), total 5 data for counts of Na atom are taken from the first line in the Table A in the step 2), to calculate an average of the 5 data for counts of Na atom and to record the average in the center column of the Table A. A graph obtained by plotting the average counts of Na atom against distance (μm) is shown in FIG. 2B. Further, in the steps 4) and 5), for each the average counts of Na atom obtained in the step 3), an inclination of average counts of Na atom against distance is determined by derivation, to record the inclination in the right column of the Table A. A graph obtained by plotting the inclination of average counts of Na atom against distance (μm) is shown in FIG. 2C. In the step 6), the maximum is decided among the inclinations shown in the right column of the Table A. In the Table A, the maximum is found to be 149.6 counts/μm at distance 11.0 μm. In the step 7), distances (A1 (μm) and A2 (μm)) which first show a value more than tenth (14.96 counts/μm) of the maximum (149.6 counts/μm) determined in the step 6) are decided, and used to calculate a deference between them. In this case, the distance A1 is 8.0 μm (inclination of average counts of Na atom is 20.8 counts/μm), and the distance A2 is 15.5 μm (inclination of average counts of Na atom is 18.8 counts/μm). Accordingly, the deference between them is 7.5 μm (=15.5-8.0). In the step 8), the steps 1) to 7) are repeated ten times per one determination. In the step 9), 4 values, i.e., the maximum, a value next to the maximum, minimum, and a value next to the minimum, are excluded from the 10 values obtained in the step 8). An average is calculated from the remaining 6 values. In the step 10), the steps 1) to 9) are repeated three times per one sample, to obtain 3 determinations. In the step 11), an average is calculated from the 3 determinations obtained in the step 10), which is called as "a sodium atom width as determined by EPMA (μm)".

TABLE A

| Distance (μm) | Counts of Na | Shift average of 5 positions | Inclination of shift average of 5 positions | |
|---|---|---|---|---|
| 0 | 3 | Average 1.2 | -0.4 | |
| 0.5 | 0 | Average 1.0 | 0 | |
| 1.0 | 1 | 1.0 | 0.8 | |
| 1.5 | 2 | 1.4 | -0.4 | |
| 2.0 | 0 | 1.2 | 0 | |
| 2.5 | 2 | 1.2 | -0.4 | |
| 3.0 | 0 | 1.0 | 0.8 | |
| 3.5 | 3 | 1.4 | 0 | |
| 4.0 | 1 | 1.4 | -0.4 | |
| 4.5 | 0 | 1.2 | 2.4 | |
| 5.0 | 1 | 2.4 | 2.4 | |
| 5.5 | 2 | 3.6 | 0.8 | |
| 6.0 | 3 | 4.0 | 2.4 | |
| 6.5 | 0 | 5.2 | 7.2 | |
| 7.0 | 6 | 8.8 | 4.4 | |
| 7.5 | 7 | 11.0 | 8.8 | |
| 8.0 | 4 | 15.4 | 20.8 | ← A1 |
| 8.5 | 9 | 25.8 | 48.8 | |
| 9.0 | 18 | 50.2 | 92.4 | |
| 9.5 | 17 | 96.4 | 121.6 | |
| 10.0 | 29 | 157.2 | 121.2 | |
| 10.5 | 56 | 217.8 | 148.8 | |
| 11.0 | 131 | 292.2 | 149.6 | ← Maximum |
| 11.5 | 249 | 367.0 | 107.6 | |
| 12.0 | 321 | 420.8 | 86.8 | |
| 12.5 | 332 | 464.2 | 127.6 | |
| 13.0 | 428 | 528.0 | 108.8 | |
| 13.5 | 505 | 582.4 | 94.4 | |
| 14.0 | 518 | 629.6 | 94 | |
| 14.5 | 538 | 676.6 | 82.4 | |
| 15.0 | 651 | 717.8 | 37.2 | |
| 15.5 | 700 | 736.4 | 18.8 | ← A2 |
| 16.0 | 741 | 745.8 | -23.6 | |
| 16.5 | 753 | 734.0 | -24.4 | |
| 17.0 | 744 | 721.8 | -51.6 | |
| 17.5 | 744 | 696.0 | -30.8 | |
| 18.0 | 747 | 680.6 | -26.8 | |
| 18.5 | 682 | 667.2 | -23.2 | |
| 19.0 | 692 | 655.6 | -24 | |
| 19.5 | 615 | 643.6 | -2 | |
| 20.0 | 667 | 642.6 | -13.6 | |
| 20.5 | 680 | 635.8 | -45.2 | |
| 21.0 | 624 | 613.2 | -60.8 | |
| 21.5 | 632 | 582.8 | -68 | |
| 22.0 | 610 | 548.8 | -119.2 | |

Accordingly, the present invention is to provide a surface-treated powdery water-absorbent resin which is obtained by polymerizing a monomer component having as a main component a carboxyl group-containing radically polymerizable compound, and wherein said water-absorbent resin is a surface-treated powdery water-absorbent resin having characteristics a) to d) as below:

a) a sodium atom width as determined by EPMA in the range of 5 to 50 μm;
b) a water content in the range 5 to 20% by weight;
c) a residual amount of monomer in the range of 0 to 300 ppm by weight; and
d) a saline flow conductivity (SFC) in the range of 10 to 500 $(10^{-7} \cdot cm^3 \cdot s \cdot g^{-1})$.

For the surface-treated water-absorbent resin (preferably powdery water-absorbent resin; similar to the following) of the present invention, a neutralization ratio of the carboxyl group inside of the water-absorbent resin preferably exceeds 60% by mol and not more than 90% by mol, and a neutralization ratio of the carboxyl group on the surface of the water-absorbent resin is preferably less than that inside of the water-absorbent resin. As used herein, the term "surface of water-absorbent resin" is referred to as a part of a water-absorbent resin which exposes to ambient air. The term "inside of water-absorbent resin", as used herein, is referred to as a part located from a surface neighborhood to a center of a water-absorbent resin. In this case, the term "surface neighborhood of water-absorbent resin", as used herein, is referred to as a layer part of tenth of a thickness of a particle diameter (minor axis) from surface of water-absorbent resin. A thickness from surface of water-absorbent resin can be confirmed by scanning electron microscope (SEM), EPMA, and the like. As used herein, the term "neutralization ratio of carboxyl group" can be determined by one of infrared absorption spectrometry methods, microATR (MicroAttenuated Total Reflection) method, and EPMA method. The EPMA method is the same as described in the explanation about "sodium atom width". Then, for the microATR method, a neutralization ratio of carboxyl group on a surface of water-absorbent resin can be determined by analyzing the surface of water-absorbent resin directly by the microATR method, and a neutralization ratio of carboxyl group inside of a water-absorbent resin can be determined by slicing the water-absorbent resin such as by ultramicrotomy (manufacture by Reichert, ULTRACUT N) to expose a central part thereof, and thereafter analyzing the exposed surface by the microATR method. As a determination device, conventional devices including FTS-575 manufacture by Bio-Rad Laboratories, Inc., can be used, for example.

For the surface-treated water-absorbent resin of the present invention, a neutralization ratio of the carboxyl group inside of the water-absorbent resin preferably exceeds 60% by mol and not more than 90% by mol, and a neutralization ratio of the carboxyl group on the surface of the water-absorbent resin is preferably less than that inside of the water-absorbent resin. A deference between the neutralization ratio of the carboxyl group inside of the water-absorbent resin and the neutralization ratio of the carboxyl group on the surface of the water-absorbent resin [=(Neutralization ratio of carboxyl group inside of water-absorbent resin)−(Neutralization ratio of carboxyl group on the surface of water-absorbent resin)] is not particularly limited, and preferably selected so as to give a powdery water-absorbent resin having good balance between fluid permeability and absorption capacity in a short time.

The method of the present invention has effects to convert fine powders generating in producing the water-absorbent resin, to granules in surface treatment of the water-absorbent resin. Therefore, even when fine powders are contained in a water-absorbent resin before surface treatment, fine powders contained therein can be converted into granules by carrying out a surface treatment method of the present invention, which is capable of reducing amount of fine powders contained in the resulting surface treated water-absorbent resin. Particle size distribution of the resulting surface treated water-absorbent resin is shifted to a higher particle size side as compared with the water-absorbent resin before surface treatment. However, ratio of this shift may be varied with kind or amount of a radical polymerization initiator, and still more, in the case of using these as an aqueous solution, this shift may be varied with ratio of water, irradiation conditions of activated energy rays, a method for flowing a water-absorbent rein in irradiation or the like.

The surface treated water-absorbent resin obtained by the method of the present invention is formed with a surface layer having higher crosslink density at the vicinity of the surface as compared with the inside, preferably a surface layer having uniform and high crosslink density throughout the whole surface of the water-absorbent resin. Accordingly, characteristics desired to the water-absorbent resin, for example, absorbency, absorption speed, gel strength, and suction force, in a high level can be improved to a high level.

In accordance with the present invention, surface treatment of the water-absorbent resin can be effected fully satisfactorily even at reaction temperature in the neighborhood of room temperature, depending on conditions, and the resulting surface treated water-absorbent resin can have extremely high levels of desired characteristics to the water-absorbent resin, such as absorption capacity, fluid permeability, absorption speed, gel strength, suction force. Still more, there may be low impurities such as remaining monomers. Therefore, the water-absorbent resin obtained by the present invention may be optimally usable as sanitary cotton, disposable diapers, sanitary goods, an incontinence pad, or other sanitary materials for absorbing body fluid; in a medical field such as medical supplies; in an agriculture field such as a soil water retention agent; foods field such as freshness retention; an industrial field such as a due condensation prevention material and cold insulation material, and depending on object or function, other additives such as silica, zeolite, an antioxidant, a surfactant, silicone oil, a chelating agent, a deodorant, perfume, a drug, a plant growth co-agent, a bacteriacide, a fungicide, a foaming agent, a pigment, a dye, a fibrous substance (hydrophilic staple fiber, pulp, synthetic fibers or the like), fertilizer, or the like may be added. The addition amount of these other additives is preferably about 0.001 to 10% by weight, relative to total weight of a product in various applications.

EXAMPLES

Now, the present invention will be described more specifically below with reference to examples and comparative examples. The present invention is not limited thereto. Hereinafter, the "part(s) by weight" may be expressed simply as "part(s)" and the "liter(s)" simply as "L" for the sake of simplicity. The method of determination and the method of evaluation indicated in the examples and the comparative example will be shown below.

(1) Particle Size Distribution 10 g of water-absorbent resin as a sample before the surface treatment and after the surface treatment were classified with test sieves having a diameter of 75 mm and mesh openings of 850 μm, 600 μm, 300 μm, and 150 μm (made by Iida Seisakusho K.K.). The weights of the portions of resin consequently divided were determined to find % by weight of each particle size. The classification was effected by shaking the sample for five minutes with the sieves made by Iida Seisakusho Ltd. and sold under the trademark designation of Sieve Shaker ES-65. The water-absorbent resin was dried at 60±5° C. under a reduced pressure (lower than 1 mmHg (133.3 Pa)) for 24 hours prior to use in the determination.

(2) Determination of Solid Content

In a cup of aluminum with 4 cm in bottom diameter and 2 cm in height, 1 g of water-absorbent resin as a sample was uniformly spread on the bottom surface of the aluminum cup. The sample in the cup was left standing in a hot air drier (EYELA, Low temperature constant temperature oven (Natural oven) NDO-450, manufactured by Tokyo Rikakiki Co., Ltd.) adjusted in advance to 180° C. for three hours. The solid content (%) of the water-absorbent resin was calculated from the loss of weight which occurred during the standing.

(3) Measurement of Extractable Content

In a plastic container with lid (measuring 6 cm in diameter×9 cm in height) having an inner volume of 250 ml, 184.3 g of physiological saline separately weighed out was placed, and 1.00 g of water-absorbent resin was added thereto, and the mixture was stirred together by the use of a magnetic stirrer measuring 8 mm in diameter and 25 mm in length, at a rotation number of 500 rpm for 16 hours to extract an extractable component in the resin. The extracted solution was passed through one filter paper (0.26 mm in thickness and 5 μm in retained particle diameter; manufactured by Advantec Toyo K.K. and sold under the product name of "JIS P3801 No. 2") and 50.0 g of the resultant filtrate was weighed out and used for the determination.

First, physiological saline alone was titrated with an aqueous 0.1N NaOH solution so as to give a pH value of 10, and subsequently titrated with an aqueous 0.1N HCl solution so as to give a pH value of 2.7, to obtain a blank titer ([bNaOH] ml and [bHCl] ml, respectively).

By carrying out the similar titrating operation on the solution under test, the titer ([NaOH] ml and [HCl] ml, respectively) was obtained.

In the case of the water-absorbent resin which is composed of known amounts of acrylic acid and sodium salt thereof, for example, the extractable content of the water-absorbent resin was calculated in accordance with the following formula, based on the titer which is obtained from the average molecular weight of the monomer and the aforementioned operation. When the amounts were unknown, the average molecular weight of the monomer was calculated by using the neutralization ratio found by titration.

Extractable content (% by weight)=0.1×(average molecular weight of monomer)×184.3×100× ([HCl]−[bHCl])/1000/1.0/50.0     [Formula 4]

Neutralization ratio (% by mol)=[1−([NaOH]−[b(NaOH)])/([HCl]−[bHCl])]×100     [Formula 5]

(4) Measurement of Residual Amount of Monomer (Residual Monomer Content)

Residual amount of monomer of a water-absorbent resin (ppm by weight, relative to a water-absorbent resin) was measured by subjecting the filtrate obtained in the above (3) to analysis with liquid chromatography equipped with a UV detector.

(5) Free Swelling Capacity (GV)

A 0.2 g of a water-absorbent resin as a sample was uniformly placed in a pouch of non-woven fabric (size: 60 mm×60 mm; manufactured by Nangoku Pulp Kogyo K.K. and sold under the trademark of "Heatlon Paper, Model GSP-22). The pouch with the sample was immersed in a large excess of an aqueous 0.9% by weight sodium chloride solution (physiological saline) at room temperature (25±2° C.). After 30 minutes' standing in the solution, the pouch was pulled up and drained at a centrifugal force of 250 G for 3 minutes by the use of a centrifugal separator. Then, the weight W1 (g) of the pouch was determined. The similar procedure was repeated without using any water-absorbent resin and the weight W2 (g) of the pouch used at that time was determined. The free swelling capacity (GV) (g/g) of the sample was calculated in accordance with the following formula using W1 and W2.

Free swelling capacity (g/g)=[W1(g)−W2(g)−weight of water-absorbent resin (g)]/(weight of the water-absorbent resin (g))     [Formula 6]

(6) Saline Flow Conductivity (SFC)

The saline flow conductivity (SFC) is a value indicating fluid permeability on swelling of a water-absorbent resin in a fluid. The higher SFC value shows that the water-absorbent resin has the higher fluid permeability.

The determination of SFC was performed by following the test for the saline flow conductivity (SFC) described in U.S. Pat. No. 5,849,405 with necessary modification.

By using this apparatus, the water-absorbent resin (0.900 g) were uniformly placed in a container 40 and left swelling in artificial urine under a pressure of 0.3 psi (2.07 kPa) for 60 minutes, and then the height of a layer of gel 44 was recorded. Subsequently, under a pressure of 0.3 psi (2.07 kPa), 0.69% by weight saline 33 from a tank 31 was passed under constant hydrostatic pressure through a swollen gel layer. This test for SFC was carried out at room temperature (20 to 25° C.). By means of a computer and a balance, the amount of fluid passing the gel layer was recorded at intervals of 20 seconds for 10 minutes as a function of time. Flow speed Fs (T) passing through the swollen gel 44 (mainly between particles) was determined in unit of [g/s] by dividing the increased weight (g) with the increased time (s). The time, in which the constant hydrostatic pressure and the stable flow speed were attained, was denoted by Ts. Only the data obtained between Ts and 10 minutes was used for calculation of the flow speed. The value Fs (T=0), namely, the initial flow speed passing through the gel layer was calculated by using the flow speed obtained between Ts and 10 minutes. The Fs (T=0) was calculated by extrapolating, the result of the least-squares method of the Fs (T) against time, to T=0.

Saline flow conductivity (SFC) =     [Formula 7]

$(Fs(t=0) \times L0)/(\rho \times A \times \Delta P) = (Fs(t=0) \times L0)/139506$ wherein Fs (t=0): the speed of flow expressed in units of g/s, L0: the height of the gel layer expressed in units of cm, $\rho$: the density of the NaCl solution (1.003 g/cm$^3$), A: the upper side area of the gel layer in the cell 41 (28.27 cm$^2$), $\Delta P$: the hydrostatic pressure exerted on the gel layer (4920 dynes/cm$^2$; and an unit of the value of SFC is ($10^{-7} \cdot$cm$^3 \cdot$s$\cdot$g$^{-1}$).

In an apparatus illustrated in FIG. 1, a tank 31 had a glass tube 32 inserted therein and a lower end of the glass tube 32 was so disposed that an aqueous 0.69% by weight saline 33 could be maintained to a height of 5 cm from the bottom of a swollen gel 44 held in a cell 41. An aqueous 0.69% by weight saline solution in the tank 31 was supplied to a cell 41 via an L-letter tube 34 fitted with a cock. Below the cell 41, a container 48 for collecting the passed fluid and this collecting container 48 was disposed on a pan scale 49. The cell 41 had an inner diameter of 6 cm. A wire mesh-screen (38 μm in mesh opening) 42 of No. 400 stainless steel was disposed on the bottom surface in the lower part of the cell. A piston 46 was provided in a lower part thereof with holes 47 sufficient for passing a liquid and fitted in the bottom part thereof with a glass filter 45 having good permeability capable of preventing water-absorbent resin particles or a swollen gel thereof from entering the hole 47. The cell 41 was laid on a stand for mounting the cell. The surface of the stand contacting the cell was placed on a wire mesh-screen 43 of stainless steel not inhibiting fluid permeation.

The artificial urine is prepared by the addition of 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of diammonium hydrogen phosphate, and 994.25 g of purified water together.

(7) Absorption Capacity Against Pressure (AAP)

A 400-mesh wire mesh-screen of stainless steel (38 μm in mesh opening) was fused to the bottom of a plastic supporting cylinder with an inner diameter of 60 mm. Under the conditions of room temperature (25±2° C.) and 50 RH % of humidity, 0.900 g of water-absorbent resin was uniformly scattered on the wire mesh-screen, and a piston and a load with an outer diameter of slightly smaller than 60 mm, which were adjusted so as to add uniformly a load of 4.83 kPa to the water-absorbent resin, not to generate a gap among the inner wall surface of the supporting cylinder, and not to prevent a vertical motion, were mounted thereon sequentially in this order. Then, the whole weight Wa (g) of the resultant measuring apparatus was determined.

A glass filter with a diameter of 90 mm (pore diameters: 100 to 120 μm: manufactured by Sogo Rikagaku Glass Manufactory K.K.) was placed inside a petri dish with a diameter of 150 mm, and an aqueous 0.9% by weight sodium chloride solution (physiological saline) (20 to 25° C.) was added to the petri dish till it rose to the same level as the upper surface of the glass filter. One filter paper with a diameter 90 mm (0.26 mm in thickness and 5 μm in retained particle diameter; made by Advantec Toyo K.K. and sold under the product name of "JIS P 3801, No. 2") was mounted on the physiological saline so as to have the surface thereof thoroughly wetted, and the excess solution was removed.

The measuring apparatus was wholly mounted on the wetted filter paper and the water-absorbent resin was allowed to absorb the solution under the load, for a predetermined time. This absorption time was set at one hour with calculating from the start of the measurement. Specifically, the whole measuring apparatus was lifted after 1 hour and the weight thereof Wb (g) was measured. This weight measurement must be carried out as quickly as possible without giving any vibration to the apparatus. Absorption capacity against pressure (AAP) (g/g) was calculated in accordance with the following expression using Wa and Wb.

$$AAP\ (g/g) = [W_b(g) - W_a(g)]/(\text{Weight of water-absorbent resin (g)}) \quad [\text{Formula 8}]$$

Production Example 1

In a kneader provided with two sigma-type blades, an acrylic acid salt type aqueous solution containing sodium acrylate, acrylic acid, and water (monomer concentration: 38% by weight, neutralization ratio: 75% by mol) was prepared, and polyethylene glycol diacrylate (number of average ethylene oxide units: n=8) as an internal crosslinking agent was dissolved therein so as to give an amount of 0.10% by mol, relative to the monomer.

Then, nitrogen gas was blown into this aqueous solution to lower oxygen concentration in the aqueous solution, and to purge the whole interior of the reaction vessel with nitrogen. Subsequently, while the two sigma type blades were kept rotated, 0.05% by mol (relative to the monomer) of sodium persulfate as a polymerization initiator, and 0.0006% by mol (relative to the monomer) of L-ascorbic acid were added to the vessel, and subjected to polymerization in the kneader while stirred for 40 minutes, to obtain a hydrogel-like polymer having an average particle diameter of 2 mm.

The resulting hydrogel-like polymer was dried in a hot air drier set at 170° C. for 45 minutes. Then, the dried polymer was pulverized with a roll mill and classified with a sieve having a mesh opening of 710 μm, to remove particles having particle diameters larger than 710 μm and to obtain a powdery water-absorbent resin (A) as a base polymer.

The resulting water-absorbent resin (A), as the base polymer, was evaluated for various properties. The results are shown in Table 1. Also, the particle size distribution of the resulting water-absorbent resin (A), as the base polymer, is shown in Table 2.

Production Example 2

A powdery water-absorbent resin (B), as a base polymer, was obtained similarly to in Production Example 1, except that used amount of the polyethylene glycol diacrylate (number of average ethylene oxide units: n=8) was changed to 0.065% by mol.

The resulting water-absorbent resin (B), as the base polymer, was evaluated for various properties. The results are shown in Table 1. Also, the particle size distribution of the resulting water-absorbent resin (B), as the base polymer, is shown in Table 2.

Production Example 3

A powdery water-absorbent resin (C), as a base polymer, was obtained similarly to in Production Example 1, except that used amount of the polyethylene glycol diacrylate (number of average ethylene oxide units: n=8) was changed to 0.09% by mol, and mesh opening of a sieve for classification was changed to 850 μm.

The resulting water-absorbent resin (C), as the base polymer, was evaluated for various properties. The results are shown in Table 1. Also, the particle size distribution of the resulting water-absorbent resin (C), as the base polymer, is shown in Table 2.

Production Example 4

In a reactor formed by a 10 L inner volume of stainless kneader provided with two sigma-type blades, a jacket and a cover, 5433 g (24.2 moles) of an aqueous solution of sodium acrylate (monomer concentration: 39% by weight) was charged, and 12.83 g (0.0246 mole) of polyethylene glycol diacrylate (number of average ethylene oxide units: n=9) as an internal cross-linking agent was dissolved in the aqueous solution to prepare a reaction solution. Then, this reaction solution was purged under nitrogen gas atmosphere. Subsequently, 29.43 g of an aqueous solution of 10% by weight of sodium persulfate as a polymerization initiator, and 24.53 g of an aqueous solution of 0.1% by weight of L-ascorbic acid were added to the reaction solution under stirring. As a result, polymerization was initiated after about 1 minute. Then under crushing generated gel, polymerization was carried out at 20 to 95° C., and at 30 minutes after initiation of polymerization, a aqueous gel-like cross-linked polymer was taken out. The obtained aqueous gel-like cross-linked polymer had a particle diameter of equal to or smaller than 5 mm. This crushed aqueous gel-like cross-linked polymer was spread on a 50 mesh (mesh opening of 300 μm) metal mesh screen and dried in a hot air drier set at 175° C. for 50 minutes. In this way, irregular, easily crushable, powdery agglomerate was obtained.

The obtained powdery agglomerate was crushed by using a roll mill, and further classified with a JIS standard sieve having a mesh opening of 710 μm. Then, by classifying particles, which had passed through the sieve having a mesh opening of 710 μm in the above operation, by use of a JIS standard sieve having a mesh opening of 150 μm, particles passing through the sieve having a mesh opening of 150 μm were removed. In this way, a water-absorbent resin (D) was obtained.

The resulting water-absorbent resin (D) was evaluated for various properties, and the results are shown in Table 1. Also, the particle size distribution of the resulting water-absorbent resin (D), as the base polymer, is shown in Table 2.

Production Example 5

A powdery water-absorbent resin (E), as a base polymer, was obtained similarly to in Production Example 4, except that used amount of the polyethylene glycol diacrylate (number of average ethylene oxide units: n=9) was changed to 11.55 g (0.0221 mole), and mesh opening of a sieve for classification was changed to 850 μm.

The resulting water-absorbent resin (E), as the base polymer, was evaluated for various properties. The results are shown in Table 1. Also, the particle size distribution of the resulting water-absorbent resin (E), as the base polymer, is shown in Table 2.

TABLE 1

|  | GV (g/g) | Extractable Content (%) | Solid Content (%) |
|---|---|---|---|
| Base polymer (A) | 31.2 | 9.0 | 94.0 |
| Base polymer (B) | 34.0 | 15.0 | 91.0 |
| Base polymer (C) | 35.2 | 8.9 | 95.8 |
| Base polymer (D) | 31.2 | 9.2 | 94.7 |
| Base polymer (E) | 35.0 | 9.0 | 96.0 |

TABLE 2

|  | Ratio(%) | |
|---|---|---|
| Particle size | Base Polymer (A), (B), (D) | Base Polymer (C), (E) |
| 850 μm< | 0.0 | 0.0 |
| 600-850 μm | 1.1 | 13.6 |
| 300-600 μm | 65.0 | 66.6 |
| 300-150 μm | 32.3 | 19.1 |
| 150 μm> | 1.6 | 0.7 |

Example 1

In a 500 mL separable flask of quartz, 30 g of the water-absorbent resin (A), as a base polymer, was added and under stirring with a stirring blade, a treatment solution to be prepared in advance by mixing 0.11 g of polyethylene glycol diacrylate (number of average ethylene oxide units: n=8), 1.64 g of acrylic acid, 2.70 g of water and 0.11 g of ammonium persulfate was added thereto. After the stirring was continued for 10 minutes, the stirred mixture was irradiated with ultraviolet rays emitted from an ultraviolet ray irradiation apparatus (manufactured by Ushio Denki K.K. and sold under the product code of UV-152/IMNSC3-AA06) provided with a metal halide lamp (manufactured by Ushio Denki K.K. and sold under the product code of UVL-1500M2-N1) at an irradiation intensity of 65 mW/cm$^2$ (determined at the nearest position to the UV lamp on the wall of separable flask of quartz by using an Ultraviolet Accumulated Actinometer UIT-150 and a photoreceiver UVD-S254 manufactured by Ushio Denki K.K.) for 20 minutes in total at room temperature. By sampling about 5 g each at an interval of several minutes (1 minute, 3 minutes, 5 minutes) after starting the irradiation of ultraviolet rays, a surface-treated water-absorbent resin (1) was obtained. These samples were found to have a residual monomer content of 138, 122 and 120 ppm by weight, respectively. In addition, neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Then, the surface-treated water-absorbent resin (1) (n=10) was tested for a sodium atom width as determined by EPMA (an average of 6 values obtained by excluding 4 values, i.e., the maximum, a value next to the maximum, minimum, and a value next to the minimum, from the 10 values), to find to be 7.58 μm, 8.33 μm, and 7.92 μm. Accordingly, a sodium atom width as determined by EPMA of the surface-treated water-absorbent resin (1) is calculated to be 7.94 μm.

Example 2

A surface treated water-absorbent resin (2) was obtained similarly to in Example 1, except that amount of ammonium persulfate was changed to 0.06 g. Residual monomer contents of samples at the UV irradiation time of 1, 3 and 5 minutes were 155, 132 and 129 ppm by weight, respectively. In addition, neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 3

A surface treated water-absorbent resin (3) was obtained similarly to in Example 1, except that amount of ammonium persulfate was changed to 0.30 g. Residual monomer contents of samples at the UV irradiation time of 1, 3 and 5 minutes were 150, 129 and 127 ppm by weight, respectively. In addition, neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 4

A surface treated water-absorbent resin (4) was obtained similarly to in Example 1, except that amount of polyethylene glycol diacrylate was changed to 0.22 g. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 5

A surface treated water-absorbent resin (5) was obtained similarly to in Example 1, except that amount of polyethylene glycol diacrylate was changed to 0.22 g, and amount of ammonium persulfate was changed to 0.06 g. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 6

A surface treated water-absorbent resin (6) was obtained similarly to in Example 1, except that amount of polyethylene glycol diacrylate was changed to 0.06 g, and amount of ammonium persulfate was changed to 0.30 g. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 7

A surface treated water-absorbent resin (7) was obtained similarly to in Example 1, except that amount of polyethylene glycol diacrylate was changed to 0.06 g, amount of acrylic acid was changed to 0.70 g, and amount of ammonium persulfate was changed to 0.30 g. Residual monomer contents of samples at the UV irradiation time of 1, 3 and 5 minutes were 110, 102 and 98 ppm by weight, respectively. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 8

A surface treated water-absorbent resin (8) was obtained similarly to in Example 1, except that amount of polyethylene glycol diacrylate was changed to 0.06 g, amount of acrylic acid was changed to 2.40 g, and amount of ammonium persulfate was changed to 0.30 g. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 9

A surface treated water-absorbent resin (9) was obtained similarly to in Example 1, except that amount of polyethylene glycol diacrylate was changed to 0.06 g, amount of ammonium persulfate was changed to 0.06 g, and 0.03 g of Irgacure 2959 (manufactured by Chiba Specialty Chemical Co., Ltd.) was newly added. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 10

A surface treated water-absorbent resin (10) was obtained similarly to in Example 1, except that a treatment solution to be prepared in advance by mixing 0.06 g of polyethylene glycol diacrylate, 1.64 g of acrylic acid, 2.70 g of water and 0.003 g of Irgacure 2959 (manufactured by Chiba Specialty Chemical Co., Ltd.) was added to 30 g of the water-absorbent resin (B), as a base polymer. Residual monomer contents of samples at the UV irradiation time of 1, 3 and 5 minutes were 210, 182 and 155 ppm by weight, respectively. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 11

A surface treated water-absorbent resin (11) was obtained similarly to in Example 1, except that amount of acrylic acid was changed to 1.23 g, and 0.54 g of sodium acrylate was newly added (neutralization ratio of the acid group-containing radically polymerizable compound; 25% by mol). Neutralization ratio of the acid group-containing radically polymerizable compound was 33% of neutralization ratio of the base polymer. Composition (including water content, if possible) of the treatment solution, and SFC value and water content of the water-absorbent resin at each treatment (UV irradiation) time are shown in Table 3.

Example 12

A surface treated water-absorbent resin (12) was obtained similarly to in Example 1, except that amount of water was changed to 2.10 g. Residual monomer contents of samples at the UV irradiation time of 1, 3 and 5 minutes were 250,222 and 188 ppm by weight, respectively. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 3.

Example 13

A surface treated water-absorbent resin (13) was obtained similarly to in Example 1, except that a treatment solution to be prepared in advance by mixing 0.03 g of glycerine acrylate methacrylate (NK ester 701A, manufactured by Shin-Nakamura Chemical Co., Ltd.), 1.20 g of acrylic acid, 2.10 g of water, 0.003 g of Irgacure 2959 (manufactured by Chiba Specialty Chemical Co., Ltd.), and 0.003 g of polyethylene glycol monomethyl ether (number average molecular weight; about 2,000) was added to 30 g of the water-absorbent resin (C), as a base polymer. Residual monomer contents of samples at the UV irradiation time of 1, 3 and 5 minutes were 242, 218 and 199 ppm by weight, respectively. Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 4.

Example 14

A surface treated water-absorbent resin (14) was obtained similarly to in Example 13, except that 0.003 g of hydroxyethylcellulose (SP600, manufactured by Dicel Chemical Industries, Ltd.) was used instead of polyethylene glycol monomethyl ether (number average molecular weight; about 2,000). Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 4.

Example 15

A surface treated water-absorbent resin (15) was obtained similarly to in Example 13, except that 0.033 g of glycerine dimethacrylate (NK ester 701, manufactured by Shin-Nakamura Chemical Industry Co., Ltd.) was used instead of glycerine acrylate methacrylate (NK ester 701A, manufactured by Shin-Nakamura Chemical Industry Co., Ltd.). Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 4.

Example 16

A surface treated water-absorbent resin (16) was obtained similarly to in Example 13, except that 0.029 g of glycerine dimethacrylate was used instead of glycerine acrylate methacrylate (NK ester 701A, manufactured by Shin-Nakamura Chemical Industry Co., Ltd.). Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 4.

Example 17

A surface treated water-absorbent resin (17) was obtained similarly to in Example 13, except that 0.042 g of trimethylolpropane triacrylate was used instead of glycerine acrylate methacrylate (NK ester 701A, manufactured by Shin-Nakamura Chemical Industry Co., Ltd.). Neutralization ratio of the acid group-containing radically polymerizable compound was 0% of neutralization ratio of the base polymer. Composition (including water content, if possible) of the treatment solution, and SFC value and water content of the water-absorbent resin at each treatment (UV irradiation) time are shown in Table 4.

Example 18

A surface treated water-absorbent resin (18) was obtained similarly to in Example 1, except that amount of acrylic acid was changed to 1.15 g, and 0.64 g of sodium acrylate was newly added (neutralization ratio of the acid group-containing radically polymerizable compound; 30% by mol). Neutralization ratio of the acid group-containing radically polymerizable compound was 40% of neutralization ratio of the base polymer. Composition (including water content, if possible) of the treatment solution, and SFC value and water content of the water-absorbent resin at each treatment (UV irradiation) time are shown in Table 4.

Example 19

A surface treated water-absorbent resin (19) was obtained similarly to in Example 1, except that amount of acrylic acid was changed to 0.98 g, and 0.86 g of sodium acrylate was newly added (neutralization ratio of the acid group-containing radically polymerizable compound; 40% by mol). Neutralization ratio of the acid group-containing radically polymerizable compound was 53% of neutralization ratio of the base polymer. Composition (including water content, if possible) of the treatment solution, and SFC value and water content of the water-absorbent resin at each treatment (UV irradiation) time are shown in Table 4.

Example 20

A surface treated water-absorbent resin (20) was obtained similarly to in Example 1, except that amount of acrylic acid was changed to 0.82 g, and 1.07 g of sodium acrylate was newly added (neutralization ratio of the acid group-containing radically polymerizable compound; 50% by mol). Neutralization ratio of the acid group-containing radically polymerizable compound was 67% of neutralization ratio of the base polymer. Composition (including water content, if possible) of the treatment solution, and SFC value and water content of the water-absorbent resin at each treatment (UV irradiation) time are shown in Table 4.

Example 21

A surface treated water-absorbent resin (20) was obtained similarly to in Example 1, except that amount of acrylic acid was changed to 0.66 g, and 1.28 g of sodium acrylate was newly added (neutralization ratio of the acid group-containing radically polymerizable compound; 60% by mol). Neutralization ratio of the acid group-containing radically polymerizable compound was 80% of neutralization ratio of the base polymer. Composition (including water content, if possible) of the treatment solution, and SFC value and water content of the water-absorbent resin at each treatment (UV irradiation) time are shown in Table 4.

Example 22-1

500 g of the water-absorbent resin (D), as a base polymer, was added to 5 L of Loedige mixer (Type M5R, manufactured by Loedige Co., Ltd.), and under stirring at 300 rpm, a treating solution to be prepared in advance by mixing 1.0 g of polyethylene glycol diacrylate (number of average ethylene oxide units: n=9), 27.4 g of acrylic acid, 45.0 g of water and 5.0 g of ammonium persulfate was sprayed thereto. After continued mixing under stirring for 3 minutes at room temperature, and making the added water permeate and diffuse into the inner part of particles, stirring was terminated once, and a sample charging port of the Loedige mixer was taken off.

10 g of the water-absorbent resin (water content: 13.0% by weight) discharged from the Loedige mixer was uniformly spread on a stainless steel circular Petri dish with a diameter of 9 cm and a depth of 1.5 cm.

Then, the water-absorbent resin was charged with the Petri dish in a water oven (trade name: Healthio, type: AX-HC3, manufactured by Sharp Co., Ltd.), and was heated for 1 minute in steamed food (strong) mode. By the treatment in this mode, a substance to be treated is heated with saturated steam, therefore heating temperature reaches 100° C. In addition, pressure inside the water oven during the heating was normal pressure (1013 hPa), and oxygen concentration in the water oven was equal to or lower than 0.5% by volume. It should be noted that the water oven was preheated by operation for 15 minutes in steamed food (strong) mode, in advance, just before the above operation.

The water-absorbent resin obtained by the above treatment was pulverized till it passed through a JIS standard sieve with a mesh opening of 850 μm to obtain a surface treated water-absorbent resin (22-1). Various evaluation results of the obtained surface treated water-absorbent resin (22-1) are shown in Table 6 below. Amount of each component in the column of "Treatment solution" in Table 6 indicates % by weight (wt %) relative to amount (500 g) of the water-absorbent resin (D) as a base polymer. In addition, "CRC after correction of water content" and "AAP after correction of water content" shown in Table 6 below were calculated in accordance with calculation equations shown below. Here, in the following expressions, "CRC before correction of water content" indicates centrifuge retention capacity (CRC) of the water-absorbent resin before measurement of water content of the above (2), and also "AAP before correction of water content" indicates absorption capacity against pressure (AAP) of the water-absorbent resin before measurement of water content of the above (2).

GV after correction of solid content (g/g)={[(GV before correction of solid content (g/g))+1]/ (Solid content of water-absorbent resin)}×100−1 [Formula 9]

AAP after correction of solid content (g/g)=[(AAP before correction of solid content (g/g))/(Solid content of water-absorbent resin)]×100 [Formula 10]

Example 22-2

A surface treated water-absorbent resin (22-2) was obtained similarly to in Example 22-1, except that heating time of the water-absorbent resin in the water oven was changed to 3 minutes. Neutralization ratio of the acid group-containing radically polymerizable compound was 0% of neutralization ratio of the base polymer. Various valuation results of the resulting surface treated water-absorbent resin (22-2) are shown in Table 6 below.

Example 22-3

A surface treated water-absorbent resin (22-3) was obtained similarly to in Example 22-1, except that heating time of the water-absorbent resin in the water oven was changed to 5 minutes. Neutralization ratio of the acid group-containing radically polymerizable compound was 0% of neutralization ratio of the base polymer. Various valuation results of the resulting surface treated water-absorbent resin (22-3) are shown in Table 6 below.

Example 22-4

A surface treated water-absorbent resin (22-4) was obtained similarly to in Example 22-1, except that heating time of the water-absorbent resin in the water oven was changed to 10 minutes. Neutralization ratio of the acid group-containing radically polymerizable compound was 0% of neutralization ratio of the base polymer. Various valuation results of the resulting surface treated water-absorbent resin (22-4) are shown in Table 6 below.

Example 22-5

A surface treated water-absorbent resin (22-5) was obtained similarly to in Example 22-1, except that heating time of the water-absorbent resin in the water oven was changed to 15 minutes. Neutralization ratio of the acid group-containing radically polymerizable compound was 0% of neutralization ratio of the base polymer. Various valuation results of the resulting surface treated water-absorbent resin (22-5) are shown in Table 6 below.

Example 23-1

A surface treated water-absorbent resin (23-1) was obtained similarly to in Example 22-1, except that the water-absorbent resin (E), as a base polymer, was used instead, and a treatment solution to be prepared in advance by mixing 0.5 g of glycerine acrylate methacrylate (NK ester 701A, manufactured by Shin-Nakamura Chemical Co., Ltd.), 20.0 g of acrylic acid, 35.0 g of water, 0.05 g of polyethylene glycol monomethyl ether (number average molecular weight; about 2,000), and 0.5 g of VA-044 (2,2'-azobis(2-(2-imidazoline-2-yl)propane)dihydrochloride, manufactured by Wako Pure Chemical Industries, Ltd.). Residual monomer content was 791 ppm by weight. Neutralization ratio of the acid group-containing radically polymerizable compound was 0% of neutralization ratio of the base polymer. Solid content of the water-absorbent resin discharged from the Loedige mixer, after mixing the base polymer and the treatment solution, under stirring, was 89.5% by weight. Various valuation results of the resulting surface treated water-absorbent resin (23-1) are shown in Table 6 below.

Example 23-2

A surface treated water-absorbent resin (23-2) was obtained similarly to in Example 23-1, except that heating time of the water-absorbent resin in the water oven was changed to 3 minutes. Residual monomer content was 678 ppm by weight. Neutralization ratio of the acid group-containing radically polymerizable compound was 0% of neutralization ratio of the base polymer. Various valuation results of the resulting surface treated water-absorbent resin (23-2) are shown in Table 6 below.

Example 23-3

A surface treated water-absorbent resin (23-3) was obtained similarly to in Example 23-1, except that heating time of the water-absorbent resin in the water oven was changed to 5 minutes. Residual monomer content was 522 ppm by weight. Neutralization ratio of the acid group-containing radically polymerizable compound was 0% of neutralization ratio of the base polymer. Various valuation results of the resulting surface treated water-absorbent resin (23-3) are shown in Table 6 below.

Comparative Example 1

A surface treated water-absorbent resin (1) for comparison was obtained similarly to in Example 1, except that amount of acrylic acid was changed to 0.56 g, and 1.41 g of sodium acrylate was newly added (neutralization ratio of the acid group-containing radically polymerizable compound; 65.9% by mol). Residual monomer contents of samples at the UV irradiation time of 1, 3 and 5 minutes were 2959, 1073 and 473 ppm by weight, respectively. Neutralization ratio of the acid group-containing radically polymerizable compound was 87% of neutralization ratio of the base polymer.

Then, the surface-treated water-absorbent resin (1) for comparison (n=10) was tested for a sodium atom width as determined by EPMA (an average of 6 values obtained by excluding 4 values, i.e., the maximum, a value next to the maximum, minimum, and a value next to the minimum, from the 10 values), to find to be 4.83 µm, 4.92 µm, and 4.67 µm. Accordingly, a sodium atom width as determined by EPMA of the surface-treated water-absorbent resin (1) for comparison is calculated to be 4.81 µm.

Comparative Example 2

A surface treated water-absorbent resin (2) for comparison was obtained similarly to in Example 1, except that amount of polyethylene glycol diacrylate was changed to 0.06 g, amount of acrylic acid was changed to 0.24 g, and amount of ammonium persulfate was changed to 0.30 g, and 0.60 g of sodium acrylate (neutralization ratio of the acid group-containing radically polymerizable compound; 65% by mol) was newly added. Residual monomer contents of samples at the UV irradiation time of 1, 3 and 5 minutes were 2816, 1036 and 378 ppm by weight, respectively. Neutralization ratio of the acid group-containing radically polymerizable compound was 87% of neutralization ratio of the base polymer.

Comparative Example 3

A surface treated water-absorbent resin (3) for comparison was obtained similarly to in Example 1, except that amount of water was changed to 1.20 g. Neutralization ratio of the acid group-containing radically polymerizable compound was 0% of neutralization ratio of the base polymer.

TABLE 3

| | Acrylic acid (g) | Sodium acrylate (g) | Polyethylene glycol diacrylate (g) | Water (g) | Ammonium persulfate (g) | Irgacure 2959 (g) | SFC at each UV irradiation time | | | Water content at each UV irradiation time | | |
|---|---|---|---|---|---|---|---|---|---|---|---|---|
| | | | | | | | 1 min. | 3 min. | 5 min. | 1 min. | 3 min. | 5 min. |
| Ex. 1 | 1.64 | 0.00 | 0.11 | 2.70 | 0.11 | 0.00 | 67 | 78 | 81 | 12.1 | 12.0 | 11.8 |
| Ex. 2 | 1.64 | 0.00 | 0.11 | 2.70 | 0.06 | 0.00 | 52 | 61 | 59 | 11.8 | 11.5 | 11.3 |
| Ex. 3 | 1.64 | 0.00 | 0.11 | 2.70 | 0.30 | 0.00 | 61 | 73 | 74 | 12.2 | 12.1 | 12.0 |
| Ex. 4 | 1.64 | 0.00 | 0.22 | 2.70 | 0.11 | 0.00 | 64 | 76 | 77 | 11.9 | 11.6 | 11.3 |
| Ex. 5 | 1.64 | 0.00 | 0.22 | 2.70 | 0.06 | 0.00 | 50 | 61 | 78 | 12.0 | 11.8 | 11.0 |
| Ex. 6 | 1.64 | 0.00 | 0.06 | 2.70 | 0.30 | 0.00 | 73 | 90 | 101 | 12.5 | 12.1 | 12.0 |
| Ex. 7 | 0.70 | 0.00 | 0.06 | 2.70 | 0.30 | 0.00 | 38 | 66 | 77 | 13.3 | 12.9 | 12.7 |
| Ex. 8 | 2.40 | 0.00 | 0.06 | 2.70 | 0.30 | 0.00 | 66 | 90 | 91 | 13.0 | 12.8 | 12.5 |
| Ex. 9 | 1.64 | 0.00 | 0.06 | 2.70 | 0.30 | 0.03 | 94 | 124 | 146 | 12.8 | 12.6 | 12.0 |
| Ex. 10 | 1.64 | 0.00 | 0.06 | 2.70 | 0.00 | 0.003 | 45 | 51 | 52 | 14.6 | 14.5 | 14.4 |
| Ex. 11 | 1.23 | 0.54 | 0.11 | 2.70 | 0.11 | 0.00 | 61 | 77 | 83 | 12.2 | 12.0 | 11.8 |
| Ex. 12 | 1.64 | 0.00 | 0.11 | 2.10 | 0.11 | 0.00 | 45 | 58 | 57 | 9.6 | 9.6 | 9.4 |
| Comp. 1 | 0.56 | 1.41 | 0.11 | 2.70 | 0.11 | 0.00 | 16 | 46 | 60 | 12.3 | 12.2 | 12.0 |
| Comp. 2 | 0.24 | 0.60 | 0.06 | 2.70 | 0.30 | 0.00 | 24 | 43 | 55 | 13.4 | 13.2 | 13.0 |
| Comp. 3 | 1.64 | 0.00 | 0.11 | 1.20 | 0.11 | 0.00 | 5 | 10 | 11 | 6.4 | 6.2 | 5.9 |

TABLE 4

| | Acrylic acid (g) | Sodium acrylate (g) | Polyethylene glycol diacrylate (g) | Water (g) | Ammonium persulfate (g) | Irgacure 2959 (g) | Crosslinking agent | (g) | Mixing co-agent | (g) | SFC at each UV irradiation time | | | Water content at each UV irradiation time | | |
|---|---|---|---|---|---|---|---|---|---|---|---|---|---|---|---|---|
| | | | | | | | | | | | 1 min. | 3 min. | 5 min. | 1 min. | 3 min. | 5 min. |
| Ex. 13 | 1.20 | 0 | 0 | 2.1 | 0 | 0.003 | NK ester 701A | 0.030 | PEGOMe | 0.003 | 82 | 80 | 80 | 9.6 | 9.4 | 9.1 |
| Ex. 14 | 1.20 | 0 | 0 | 2.1 | 0 | 0.003 | NK ester 701A | 0.030 | SP600 | 0.003 | 118 | 116 | 115 | 9.1 | 9.0 | 8.9 |
| Ex. 15 | 1.20 | 0 | 0 | 2.1 | 0 | 0.003 | NK ester 701 | 0.033 | PEGOMe | 0.003 | 52 | 70 | 75 | 9.7 | 9.3 | 9.2 |
| Ex. 16 | 1.20 | 0 | 0 | 2.1 | 0 | 0.003 | Glycerol diacrylate | 0.029 | PEGOMe | 0.003 | 91 | 97 | 95 | 9.7 | 9.3 | 9.1 |
| Ex. 17 | 1.20 | 0 | 0 | 2.1 | 0 | 0.003 | Trimethyrol propane triacrylate | 0.042 | PEGOMe | 0.003 | 72 | 73 | 75 | 9.7 | 9.2 | 9.0 |
| Ex. 18 | 1.15 | 0.64 | 0.11 | 2.7 | 0.11 | 0 | | | | | 56 | 70 | 83 | 9.7 | 9.3 | 9.2 |
| Ex. 19 | 0.98 | 0.86 | 0.11 | 2.7 | 0.11 | 0 | | | | | 46 | 62 | 89 | 9.8 | 9.3 | 9.1 |
| Ex. 20 | 0.82 | 1.07 | 0.11 | 2.7 | 0.11 | 0 | | | | | 42 | 61 | 96 | 9.8 | 9.4 | 9.1 |
| Ex. 21 | 0.66 | 1.28 | 0.11 | 2.7 | 0.11 | 0 | | | | | 37 | 52 | 80 | 9.9 | 9.6 | 9.3 |

TABLE 5

| | Water-absorbent resin (WAR) | Treatment method | Treating agent | | | | | | | MNR *2 mol % | Treatment Time min | Solid Content wt % | Before correction of solid content | | | After correction of solid content | | |
|---|---|---|---|---|---|---|---|---|---|---|---|---|---|---|---|---|---|---|
| | | | P wt % | AA wt % | W wt % | APS wt % | PEGOMe wt % | 701A | VA-044 | | | | GV g/g | AAP g/g | SFC | GV g/g | AAP g/g |
| Prod. Ex. 4 | WAR (D) | | | | | | | | | | — | 94.7 | 31.2 | 7.7 | 0 | 33.3 | 8.1 |
| Prod. Ex. 5 | WAR (E) | | | | | | | | | | — | 96.0 | 35.0 | 7.2 | 0 | 36.5 | 7.5 |
| Ex. 22-1 | WAR (22-1) | WO *1 | 0.2 | 5.48 | 9 | 1 | | | | 0 | 1 | 84.6 | 22.8 | 19.8 | 40 | 27.1 | 23.4 |
| Ex. 22-2 | WAR (22-2) | WO *1 | 0.2 | 5.48 | 9 | 1 | | | | 0 | 3 | 82.7 | 22.1 | 18.6 | 54 | 26.9 | 22.5 |
| Ex. 22-3 | WAR (22-3) | WO *1 | 0.2 | 5.48 | 9 | 1 | | | | 0 | 5 | 77.4 | 19.5 | 16.7 | 60 | 25.5 | 21.6 |
| Ex. 22-4 | WAR (22-4) | WO *1 | 0.2 | 5.48 | 9 | 1 | | | | 0 | 10 | 76.7 | 18.8 | 16.4 | 103 | 24.8 | 21.4 |
| Ex. 22-5 | WAR (22-5) | WO *1 | 0.2 | 5.48 | 9 | 1 | | | | 0 | 15 | 75.3 | 17.0 | 15.3 | 207 | 22.9 | 20.3 |
| Ex. 23-1 | WAR (23-1) | WO *1 | | 4 | 7 | | 0.01 | 0.1 | 0.1 | 0 | 1 | 86.5 | 26.3 | 20.3 | 40 | 30.6 | 23.5 |

TABLE 5-continued

| Water-absorbent resin (WAR) | Treatment method | Treating agent | | | | | | | MNR *2 mol % | Treatment Time min | Solid Content wt % | Before correction of solid content | | | After correction of solid content | |
| | | P wt % | AA wt % | W wt % | APS wt % | PEGOMe wt % | 701A | VA-044 | | | | GV g/g | AAP g/g | SFC | GV g/g | AAP g/g |
|---|---|---|---|---|---|---|---|---|---|---|---|---|---|---|---|---|
| Ex. 23-2 | WAR (23-2) | WO *1 | | 4 | 7 | | 0.01 | 0.1 | 0.1 | 0 | 3 | 84.9 | 25.6 | 20 | 42 | 30.3 | 23.6 |
| Ex. 23-3 | WAR (23-3) | WO *1 | | 4 | 7 | | 0.01 | 0.1 | 0.1 | 0 | 5 | 81.5 | 24.9 | 19.2 | 46 | 30.8 | 23.6 |

*1 WO: Water oven, Mode: steamed food (strong)
*2 MNR: Monomer neutralization ratio (mol %)
P: Polyethylene glycol diacrylate (number of average ethylene oxide units, n = 9)
AA: Acrylic acid
W: Pure water
APS: Ammonium persulfate
PEGOMe: Polyethylene glycol monomethyl ether (number average molecular weight; about 2,000)
701A: Glycerine acrylate methacrylate (NK ester 701A, manufactured by Shin-Nakamura Chemical Co., Ltd.)
VA-044: 2,2'-azobis(2-(2-imidazoline-2-yl)propane)dihydrochloride, manufactured by Wako Pure Chemical Industries, Ltd.)

It can be noted from the results shown in the above Tables that the water-absorbent resins (1) to (23) of the present invention satisfied desired SFC value in an extremely shorter period of time, as compared with comparative water-absorbent resins (1) to (3). It is noted the Tables 3 and 4 that by the comparison of Examples 1 (neutralization ratio of treating agent=0% by mol), 11 (neutralization ratio of treating agent=25% by mol), 18 (neutralization ratio of treating agent=30% by mol), 19 (neutralization ratio of treating agent=35% by mol), 20 (neutralization ratio of treating agent=40% by mol), 21 (neutralization ratio of treating agent=50% by mol), and 22 (neutralization ratio of treating agent=60% by mol) with Comparative Example 1 (neutralization ratio of treating agent=65.9% by mol), SFC value, particularly SFC value at UV irradiation time of 1 minute is degraded when neutralization ratio of treating agent as acid group-containing radically polymerizable compound exceeds 60% by mol.

The entire disclosure of Japanese Patent Application No. 2007-263590 filed on Oct. 9, 2007, Japanese Patent Application No. 2007-263593 filed on Oct. 9, 2007, and Japanese Patent Application No. 2008-185928 filed on Jul. 17, 2008 including specification, claims, drawings and summary are incorporated herein by reference in its entirety.

The invention claimed is:

1. A surface-treated water-absorbent resin obtained by a method comprising:
   a) a step for mixing 0.1 to 20 parts by weight of an acid group-containing radically polymerizable compound and 5 to 20 parts by weight of water, relative to 100 parts by weight of a water-absorbent resin; and
   b) a step for polymerizing the acid group-containing radically polymerizable compound,
   wherein neutralization ratio of the acid group-containing radically polymerizable compound is 0 to 60% by mol, and is lower than neutralization ratio of the water-absorbent resin;
   wherein residual amount of monomer is in the range of 0 to 300 ppm by weight;
   wherein said surface-treated water-absorbent resin has a sodium atom width as determined by electron probe micro analysis (EPMA) in the range of 5 to 50 μm; and
   wherein the numerical value ratio of the neutralization ratio of the acid group-containing radically polymerizable compound relative to the neutralization ratio of the water-absorbent resin is in the range of 0 to 80%.

2. A surface-treated powdery water-absorbent resin according to claim 1 that is obtained by polymerizing a monomer component having as a main component a carboxyl group-containing radically polymerizable compound,
   wherein said water-absorbent resin is a surface-treated powdery water-absorbent resin having characteristics a) to d) as below:
   a) a sodium atom width as determined by EPMA in the range of 5 to 50 μm;
   b) a water content in the range 5 to 20% by weight;
   c) a residual amount of monomer in the range of 0 to 300 ppm by weight; and
   d) a saline flow conductivity (SFC) in the range of 10 to 500 $(10^{-7} \cdot cm^3 \cdot s \cdot g^{-1})$.

3. The surface-treated powdery water-absorbent resin according to claim 2 that has a neutralization ratio of the carboxyl group inside of the water-absorbent resin exceeding 60% by mol and not more than 90% by mol, and a neutralization ratio of the carboxyl group on the surface of the water-absorbent resin less than that inside of the water-absorbent resin.

* * * * *